United States Patent
Ikeda et al.

(10) Patent No.: US 10,960,612 B2
(45) Date of Patent: Mar. 30, 2021

(54) METHOD FOR MANUFACTURING FIBER-REINFORCED COMPOSITE MATERIAL AND FIBER-REINFORCED COMPOSITE MATERIAL

(71) Applicant: Mitsubishi Chemical Corporation, Tokyo (JP)

(72) Inventors: Kazuhisa Ikeda, Tokyo (JP); Yoshihide Kakimoto, Tokyo (JP); Daiki Hirakawa, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/739,332

(22) PCT Filed: Jul. 8, 2016

(86) PCT No.: PCT/JP2016/070250
§ 371 (c)(1),
(2) Date: Dec. 22, 2017

(87) PCT Pub. No.: WO2017/007012
PCT Pub. Date: Jan. 12, 2017

(65) Prior Publication Data
US 2018/0186101 A1 Jul. 5, 2018

(30) Foreign Application Priority Data
Jul. 8, 2015 (JP) .............................. JP2015-136824

(51) Int. Cl.
*B29C 70/20* (2006.01)
*B29C 70/46* (2006.01)
(Continued)

(52) U.S. Cl.
CPC ............ *B29C 70/207* (2013.01); *B29B 11/16* (2013.01); *B29C 70/086* (2013.01);
(Continued)

(58) Field of Classification Search
CPC . B29B 11/16; B29C 70/345; B29C 70/46–48; B29C 70/541–543; B29C 70/546; B29C 70/56; B29C 2043/3602
(Continued)

(56) References Cited

U.S. PATENT DOCUMENTS 4,946,640 A * 8/1990 Nathoo ................. B29C 51/082
264/316
4,953,234 A * 9/1990 Li ............................ A42B 3/06
2/2.5
(Continued)

FOREIGN PATENT DOCUMENTS

CN 103252946 A 8/2013
DE 102013209270 A1 11/2014
(Continued)

OTHER PUBLICATIONS

Machine translation of Japanese Patent Publication No. JP-2011093253A, originally published May 12, 2011, 29 pages (Year: 2011).*
(Continued)

*Primary Examiner* — Matthew J Daniels
*Assistant Examiner* — Hana C Page
(74) *Attorney, Agent, or Firm* — Morgan, Lewis & Bockius LLP

(57) ABSTRACT

The purpose of the present invention is to obtain a fiber-reinforced composite material having excellent appearance or mechanical characteristics, whereby a three-dimensional shape is molded with high productivity while appearance defects such as fiber meandering or wrinkling are suppressed. In this method for manufacturing a fiber-reinforced composite material, when a stack in which a plurality of sheet-shaped prepregs (X) in which a plurality of continuously arranged reinforcing fibers are impregnated with a
(Continued)

matrix resin composition are layered in different fiber directions is molded into a three-dimensional shape by a molding die (100) provided with a lower die (110) and an upper die (112), a stretchable sheet (10) or a resin film (Y) used in the stack (12) is utilized. In this method for manufacturing a fiber-reinforced composite material, the stack may be pre-molded to obtain a preform, and the preform may be furthermore compression-molded to obtain a fiber-reinforced composite material.

8 Claims, 12 Drawing Sheets

(51) Int. Cl.
| | |
|---|---|
| *B29B 11/16* | (2006.01) |
| *B29C 70/08* | (2006.01) |
| *B29C 70/22* | (2006.01) |
| *B32B 5/12* | (2006.01) |
| *B32B 5/26* | (2006.01) |
| *B32B 27/12* | (2006.01) |
| *B29K 105/08* | (2006.01) |

(52) U.S. Cl.
CPC .......... *B29C 70/222* (2013.01); *B29C 70/228* (2013.01); *B29C 70/46* (2013.01); *B32B 5/12* (2013.01); *B32B 5/26* (2013.01); *B32B 27/12* (2013.01); *B29K 2105/0872* (2013.01); *B29K 2105/0881* (2013.01)

(58) Field of Classification Search
USPC ........................................................ 156/242
See application file for complete search history.

(56) References Cited

U.S. PATENT DOCUMENTS

| | | | | |
|---|---|---|---|---|
| 5,264,058 | A * | 11/1993 | Hoagland | B32B 17/10844 156/102 |
| 9,895,867 | B2 * | 2/2018 | Kawabe | C08J 5/24 |
| 2008/0265464 | A1 * | 10/2008 | D'Hooghe | B29C 43/36 264/322 |
| 2011/0064908 | A1 | 3/2011 | Kweder | |
| 2012/0067509 | A1 | 3/2012 | Kurtz et al. | |
| 2014/0134378 | A1 | 5/2014 | Downs et al. | |
| 2015/0283730 | A1 * | 10/2015 | Kakimoto | B29C 70/44 264/138 |
| 2016/0039185 | A1 | 2/2016 | Kawabe et al. | |

FOREIGN PATENT DOCUMENTS

| | | |
|---|---|---|
| EP | 2894019 A1 | 7/2015 |
| EP | 2915645 A1 | 9/2015 |
| FR | 2820359 A1 | 8/2002 |
| JP | 03-166914 A | 7/1991 |
| JP | 04-251715 A | 9/1992 |
| JP | 2007-168272 A | 7/2007 |
| JP | 2008-230236 A | 10/2008 |
| JP | 2011-093253 A | 5/2011 |
| JP | 2014-051077 A | 3/2014 |
| JP | 2014-073580 A | 4/2014 |
| JP | 2014-208457 A | 11/2014 |
| WO | 2010/097547 A2 | 9/2010 |
| WO | 2014/038710 A1 | 3/2014 |
| WO | 2014/069503 A1 | 5/2014 |

OTHER PUBLICATIONS

Peters, S.T., Handbook of Composites, Second Edition, 1998, pp. 9-11 (Year: 1998).*
English Translation of JP2014073580. Ikeda. Published Apr. 24, 2014 (Year: 2014).*
"Silicone Rubber Sheeting and Interflow" (Available on Feb. 18, 2015). (Year: 2015).*
English Translation of DE102013209270 (Year: 2013).*
International Search Report issued in corresponding International Application No. PCT/JP2016/070250 dated Sep. 13, 2016.
Campbell, "Introduction to Composite Materials and Processes: Laminates" in Manufacturing Processes for Advanced Composites, Elsevier Advanced Technology, pp. 3 and 5 (2004).
Partial Supplementary European Search Report issued in corresponding European Patent Application No. 16821480.7 fated Jun. 14, 2018.
Daicel-Evonik Ltd., "Foam core material for composite which has high heat, creap compression resistance and superior mechanical properties," https://www.daicel-evonik.com/product/detail/4 (print out date Apr. 23, 2018).
Notice of Reasons for Revocation issued in related Japanese Patent Application No. 2016-548746 dated Jul. 6, 2018.
Written Opposition to Grant issued in related Japanese Patent Application No. 2016-548746 dated Jun. 1, 2018.
Extended European Search Report issued in corresponding European Patent Application No. 16821480.7, dated Sep. 17, 2018.
Opposition decision in corresponding Japanese Patent Application No. 2016-548746 dated May 20, 2019 along with English translation of same.
Office Action dated Nov. 13, 2019 issued in corresponding European Patent Application No. 16821480.7.
Notice of Reasons for Revocation issued in corresponding Japanese Patent Application No. 2016-548746, dated Dec. 5, 2018.
Extended Search Report issued in European Patent Application No. 20160917.9 dated Jul. 27, 2020.

* cited by examiner

METHOD FOR MANUFACTURING FIBER-REINFORCED COMPOSITE MATERIAL AND FIBER-REINFORCED COMPOSITE MATERIAL

TECHNICAL FIELD

The present invention relates to a method for manufacturing a fiber-reinforced composite material and a fiber-reinforced composite material.

This application is based upon and claims the benefit of priority of the prior Japanese Patent Application No. 2015-136824 filed in Japan on Jul. 8, 2015, the entire contents of which are incorporated herein by reference.

BACKGROUND ART

In a variety of fields such as aircraft members and automobile members, for example, a fiber-reinforced composite material formed in a complicated shape such as a three-dimensional shape by heating and pressurizing a sheet-shaped prepreg containing a reinforcing fiber and a thermosetting resin or a stack composed of a laminate of the prepreg is used. In the manufacture of a fiber-reinforced composite material, it is difficult to form the fiber-reinforced composite material at one time particularly in the case of manufacturing a fiber-reinforced composite material having a complicated shape accompanied by shear deformation such as a three-dimensional curved surface shape or a hemispherical shape. In this case, a preform is manufactured in an intermediate shape based on the final shape by subjecting the stack to preparatory molding prior to the compression molding for forming the final shape.

However, in the manufacture of fiber-reinforced composite materials and preforms, the reinforcing fibers in the stack cannot follow the deformation at the time of molding, fiber meandering and generation of wrinkles occur in the fiber-reinforced composite materials and preforms to be obtained, and this results in appearance defects in some cases. Particularly in the case of using a prepreg in which reinforcing fibers are oriented in one direction or two or more directions, the reinforcing fibers hardly follow the deformation in the direction in which the reinforcing fibers are not oriented.

Specifically, in order to obtain a fiber-reinforced composite material having excellent isotropic mechanical properties, for example, a stack in which a sheet-shaped UD prepreg having reinforcing fibers aligned in one direction is generally pseudo-isotropically laminated so that the fiber directions of the respective layers in a planar view are [0°/45°/90°/135°] is used in molding. However, wrinkles are likely to be generated in the preform to be obtained when this stack is molded into a three-dimensional shape having a curved surface. In addition, meandering of the reinforcing fiber is likely to occur in the fiber-reinforced composite material obtained by compression molding of this preform, and the appearance and mechanical properties of the fiber-reinforced composite material greatly deteriorate in some cases. This problem is partly improved by molding a stack in which a UD prepreg is laminated so that the fiber directions of the respective layers are [0°/90°/45°/135°] instead of a general pseudo-isotropic laminating, but there is a limitation on this improvement effect.

It is possible to mold the fiber-reinforced composite material into a three-dimensional shape having a curved surface while suppressing the generation of wrinkles when a laminated UD prepreg is divided into a paired part in which the fiber directions are [0°/90°] and a paired part in which the fiber directions are [45°/135°] and the respective paired parts are molded. This is because it is considered that it is possible to relatively easily extend and stretch the paired part of [0°/90°] in the directions of 45° and 135° and the paired part of [45°/135°] in the directions of 0° and 90° at the time of molding. However, this method leads to increases in working time and cost since it is required to mold a plurality of paired parts, respectively, in this method.

Meanwhile, there is also proposed a method in which a tensile force is applied to a stack to be molded to promote the followability in a direction in which the reinforcing fibers are not oriented and thus to improve the moldability when manufacturing a preform (Patent Literatures 1 and 2).

However, in the above method, the manufacturing steps are troublesome since it is required to grip the stack to be molded with a clamp each time. In addition, the stack is directly gripped with a clamp in order to apply a tensile force, and thus the reinforcing fiber meanders or damage is caused at the gripped part in some cases. There is also a method in which a surplus part is provided in advance in addition to the part to be a product and the surplus part is gripped with a clamp. However, this method is unsuitable for mass production since it is required to cut and remove the surplus part after molding, thus the steps are further increased, and the manufacture is more troublesome.

CITATION LIST

Patent Literature

Patent Literature 1: JP 2014-51077 A
Patent Literature 2: JP 2014-73580 A

SUMMARY OF THE INVENTION

Problem to be Solved by the Invention

An object of the invention is to provide a method for manufacturing a fiber-reinforced composite material, which can manufacture a fiber-reinforced composite material which is molded into a three-dimensional shape, particularly a three-dimensional curved surface shape having a curved surface (including a combination of a plurality of planes) which is not a developable surface and has an excellent appearance and excellent mechanical properties with high productivity while suppressing appearance defects such as fiber meandering and wrinkles, and a fiber-reinforced composite material having both an excellent appearance and excellent mechanical properties.

Means for Solving Problem

The invention has the following configuration.

[1] A method for manufacturing a fiber-reinforced composite material, the method including molding a stack obtained by laminating a plurality of sheet-shaped prepregs (X) including a plurality of consecutively arranged reinforcing fibers impregnated with a matrix resin composition such that fiber directions are different from each other into a three-dimensional shape by using a molding die equipped with a pair of dies.

[2] The method for manufacturing a fiber-reinforced composite material according to [1], in which the stack is formed into a preform by preparatory molding and the preform is further subjected to compression molding to obtain a fiber-reinforced composite material.

[3] The method for manufacturing a fiber-reinforced composite material according to [1] or [2], in which a stack obtained by laminating a plurality of the prepregs (X) and one or more resin films (Y) (provided that the prepreg (X) is excluded) formed of a resin composition is used as the stack.

[4] The method for manufacturing a fiber-reinforced composite material according to [3], in which a stack which includes a laminated unit having a five-layer configuration of prepreg (X)/prepreg (X)/resin film (Y)/prepreg (X)/prepreg (X) and in which fiber directions of prepregs (X) of a second layer, a fourth layer, and a fifth layer are each from 15° to 165° when a fiber direction of a prepreg (X) of a first layer is taken as 0° and the fiber directions of the respective layers are different from each other is used as the stack.

[5] The method for manufacturing a fiber-reinforced composite material according to [4], in which a fiber direction of a prepreg (X) of the second layer is from 85° to 95°, a fiber direction of a prepreg (X) of the fourth layer is from 30° to 60°, and a fiber direction of a prepreg (X) of the fifth layer is from 120° to 150°.

[6] The method for manufacturing a fiber-reinforced composite material according to [4] or [5], in which a stack which includes two or more of the laminated units and is obtained by laminating the laminated units such that the resin film (Y) is sandwiched between the laminated units adjacent to each other in a thickness direction is used as the stack.

[7] The method for manufacturing a fiber-reinforced composite material according to any one of [4] to [6], in which a stack which includes two of the laminated units having the same laminated configuration and is obtained by laminating the laminated units such that a laminated order of the laminated units is symmetrical in a thickness direction is used as the stack.

[8] The method for manufacturing a fiber-reinforced composite material according to any one of [5] to [7], in which a stack including a laminated unit in which a difference in angle between a fiber direction of the fourth layer and a fiber direction of the fifth layer is 90° is used as the stack.

[9] The method for manufacturing a fiber-reinforced composite material according to any one of [1] to [8], in which the stack is formed into a three-dimensional shape which cannot be developed in a plane.

[10] The method for manufacturing a fiber-reinforced composite material according to any one of [3] to [9], in which composition of a matrix resin composition to be contained in the prepreg (X) and composition of a resin composition to be contained in the resin film (Y) are the same.

[11] The method for manufacturing a fiber-reinforced composite material according to any one of [3] to [10], in which a thickness of the resin film (Y) is from 0.1 to 1 mm.

[12] The method for manufacturing a fiber-reinforced composite material according to any one of [1] to [11], in which a cloth prepreg is used as the prepreg (X).

[13] A fiber-reinforced composite material including the following resin layers A to E laminated in this order, in which a smallest angle is 45° or less among angles formed by fiber directions of reinforcing fibers in a planar view between respective two layers of the resin layers A, B, D, and E:

resin layers A, B, D, and E: resin layers containing reinforcing fibers aligned in one direction, and resin layer C: a resin layer not containing a reinforcing fiber aligned in one direction.

[14] The fiber-reinforced composite material according to [13], in which fiber directions of reinforcing fibers of the resin layer B, the resin layer D, and the resin layer E are each from 15° to 165° when a fiber direction of a reinforcing fiber of the resin layer A is taken as 0°.

[15] The fiber-reinforced composite material according to [13] or [14], in which the smallest angle is from 15° to 45°.

[16] The method for manufacturing a fiber-reinforced composite material according to any one of [1] to [12], in which a pair of the dies are brought close to each other in a state in which a stretchable resin or rubber sheet is disposed between one die of a pair of the dies constituting the molding die and the stack while being tensioned in a specific direction and the stack is molded by a pair of the dies while extending the stretchable sheet.

[17] The method for manufacturing a fiber-reinforced composite material according to [16], in which a pair of the dies includes a lower die and an upper die, the stretchable sheet is disposed while being tensioned such that the stretchable sheet partly comes into contact with a part of a molding surface of the lower die facing the upper die, and the stack is molded by bringing the upper die and the lower die close to each other in a state in which the stack is disposed on the stretchable sheet.

[18] The method for manufacturing a fiber-reinforced composite material according to [16] or [17], in which a preform is obtained by preparatory molding using the stretchable sheet and the preform is then formed into a fiber-reinforced composite material by being subjected to compression molding again by a pair of the dies in a state in which the stretchable sheet is not disposed.

[19] The method for manufacturing a fiber-reinforced composite material according to any one of [16] to [18], in which reinforcing fibers in the stack are aligned in two or more directions.

[20] The method for manufacturing a fiber-reinforced composite material according to any one of [16] to [19], in which the stack is molded in a state in which the stretchable sheet is tensioned in one or more directions such that an angle formed by a fiber direction of each prepreg (X) in the stack and a direction in which the stretchable sheet is tensioned is from 15° to 75°.

[21] The method for manufacturing a fiber-reinforced composite material according to [20], in which an angle formed by a fiber direction of each prepreg (X) in the stack and a direction in which the stretchable sheet is tensioned is from 30° to 60°.

Effect of the Invention

According to the method for manufacturing a fiber-reinforced composite material of the invention, it is possible to manufacture a fiber-reinforced composite material which is molded into a three-dimensional shape, particularly a three-dimensional curved surface shape having a curved surface (including a combination of a plurality of planes) which is not a developable surface and has an excellent appearance and excellent mechanical properties with high productivity while suppressing appearance defects such as fiber meandering and wrinkles.

The fiber-reinforced composite material of the invention has suppressed appearance defects such as fiber meandering and wrinkles and thus has both an excellent appearance and excellent mechanical properties.

MODE(S) FOR CARRYING OUT THE INVENTION

Figure 1:
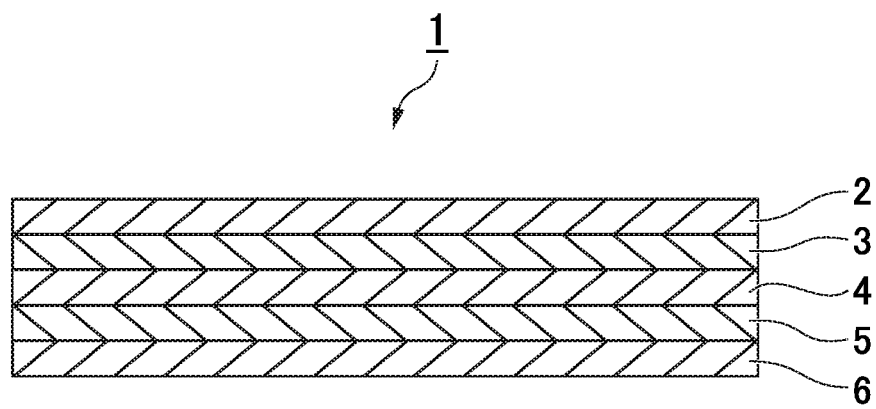
FIG. 1 is a cross-sectional view illustrating an example of a laminated unit used in a method for manufacturing a fiber-reinforced composite material of the invention.
Figure 1:
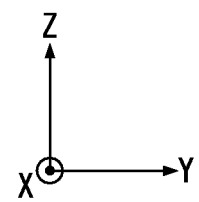
Figure 2A:
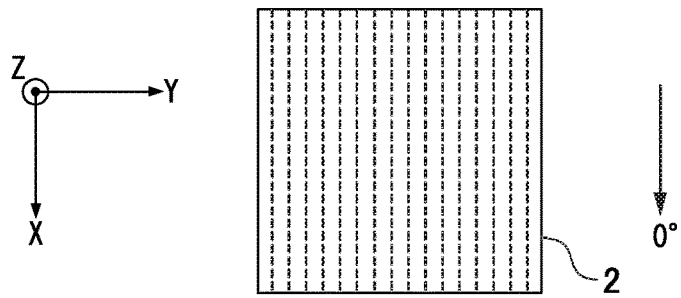
FIG. 2A is a plan view illustrating a prepreg (X) of a first layer in a laminated unit.
Figure 2B:
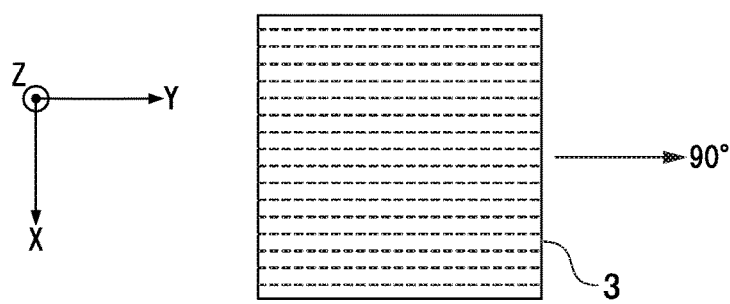
FIG. 2B is a plan view illustrating a prepreg (X) of a second layer in the laminated unit.
Figure 2C:
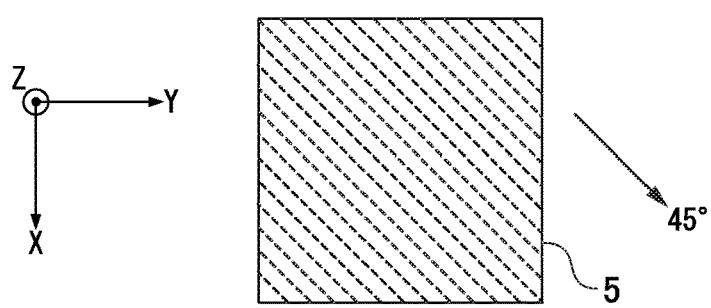
FIG. 2C is a plan view illustrating a prepreg (X) of a fourth layer in the laminated unit.
Figure 2D:
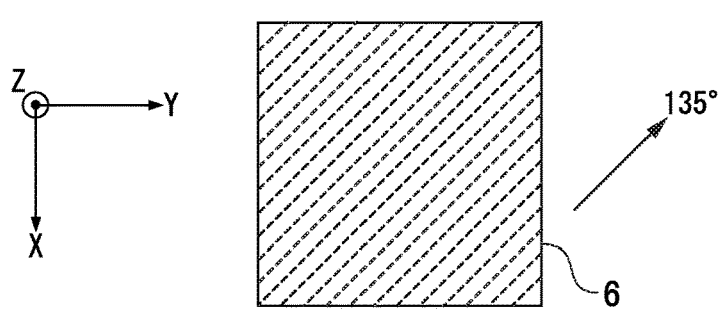
FIG. 2D is a plan view illustrating a prepreg (X) of a fifth layer in the laminated unit.

In the present specification, the fiber direction of the prepreg in the stack is defined as positive in the counterclockwise direction when the stack is viewed in a planar view from the first layer side.

In the case of a UD prepreg in which reinforcing fibers are aligned in one direction, the fiber direction of the prepreg is defined as the orientation direction of the reinforcing fibers. In the case of a cloth prepreg in which reinforcing fibers are woven so as to cross each other at right angles, the orientation direction of the reinforcing fibers of the warp is defined as the fiber direction. In the case of a prepreg using another reinforcing fiber fabric as a base material, the direction of an axis of symmetry which bisymmetrically divides the prepreg in the sheet surface of the prepreg and at which the component of the reinforcing fiber of which the fiber axis direction is in the direction of the axis of symmetry is the greatest is defined as the fiber direction.

[Method for Manufacturing Fiber-Reinforced Composite Material]

The method for manufacturing a fiber-reinforced composite material of the invention is a method for obtaining a fiber-reinforced composite material by molding a stack in which a plurality of sheet-shaped prepregs (X) in which a plurality of consecutively arranged reinforcing fibers are impregnated with a matrix resin composition are laminated such that the fiber directions are different from each other into a three-dimensional shape by using a molding die equipped with a pair of dies. The method for manufacturing a fiber-reinforced composite material of the invention may be a method for forming a stack into a fiber-reinforced composite material by one time of compression molding or a method for obtaining a fiber-reinforced composite material by forming a stack into a preform by preparatory molding and further subjecting the preform to compression molding. A method for obtaining a fiber-reinforced composite material by forming a stack into a preform by preparatory molding and further subjecting the preform to compression molding is preferable from the viewpoint of easily obtaining a fiber-reinforced composite material having a three-dimensional curved surface shape having a curved surface which is not a developable surface while suppressing appearance defects such as fiber meandering and wrinkles.

(Stack)

The stack is one in which a plurality of sheet-shaped prepregs (X) in which a plurality of consecutively arranged reinforcing fibers are impregnated with a matrix resin composition are laminated such that the fiber directions are different from each other. By using such a stack, it is possible to manufacture a fiber-reinforced composite material having a three-dimensional shape and excellent mechanical properties.

As the stack, it is preferable to use a stack in which a plurality of prepregs (X) and one or more resin films (Y) (provided that the prepreg (X) is excluded) formed of a resin composition are laminated. This makes it possible to manufacture a fiber-reinforced composite material having suppressed appearance defects such as wrinkles in a shorter time.

As the stack in which a plurality of prepregs (X) and one or more resin films (Y) are laminated, a stack including a laminated unit having a five-layer configuration of prepreg (X)/prepreg (X)/resin film (Y)/prepreg (X)/prepreg (X) is preferable. In the laminated unit, the fiber directions of the prepregs (X) of the second layer, the fourth layer, and the fifth layer are each from 15° to 165° when the fiber direction of the prepreg (X) of the first layer is taken as 0° and the fiber directions of the respective layers are different from each other. By using a stack including such a laminated unit, it is possible to manufacture a fiber-reinforced composite material having reinforcing fibers pseudo-isotropically arranged, both excellent mechanical properties and an excellent appearance, and a three-dimensional shape.

In the laminated unit, it is preferable that the fiber direction of the prepreg (X) of the second layer is from 85° to 95°, the fiber direction of the prepreg (X) of the fourth layer is from 30° to 60°, and the fiber direction of the prepreg (X) of the fifth layer is from 120° to 150°. In other words, a laminated unit having a laminated configuration of [0°/θ1/resin film (Y)/θ2/θ3] (provided that θ1 to θ3 are the fiber directions of the prepregs (X) of the second layer, the fourth layer, and the fifth layer when the fiber direction of the prepreg (X) of the first layer is taken as 0° and θ1=85° to 95°, θ2=30° to 60°, and θ3=120° to 150°) is more preferable.

Incidentally, 0° in [0°/θ1/resin film (Y)/θ2/θ3] means a prepreg (X) having a fiber direction of 0°. In the same manner, θ1, θ2, and θ3 mean prepregs (X) having fiber directions of θ1, θ2, and θ3, respectively.

The angle θ1 in the fiber direction of the prepreg (X) of the second layer is preferably from 85° to 95°, more preferably from 87.5° to 92.5°, and particularly preferably 90° from the viewpoint of easily obtaining a fiber-reinforced composite material having a three-dimensional shape and both excellent mechanical properties and an excellent appearance while suppressing appearance defects such as wrinkles.

The angle θ2 in the fiber direction of the prepreg (X) of the fourth layer is preferably from 30° to 60°, more preferably from 40° to 50°, and particularly preferably 45° from the viewpoint of easily obtaining a fiber-reinforced composite material having a three-dimensional shape and both excellent mechanical properties and an excellent appearance while suppressing appearance defects such as wrinkles.

The angle θ3 in the fiber direction of the prepreg (X) of the fifth layer is preferably from 120° to 150°, more preferably from 130° to 140°, and particularly preferably 135° from the viewpoint of easily obtaining a fiber-reinforced composite material having a three-dimensional shape and both excellent mechanical properties and an excellent appearance while suppressing appearance defects such as wrinkles.

In addition, when θ2 and θ3 are within the above ranges, it is easy to subject the parts of the fourth layer and the fifth layer to shear deformation and even a stack including a laminated unit in which reinforcing fibers are oriented in four axes can be easily molded while suppressing the generation of wrinkles. In addition, the reinforced fibers are relatively equally oriented in the four axial directions in the fiber-reinforced composite material to be obtained, and the mechanical properties can be thus equalized.

It is more preferable that the difference in angle between the fiber direction of the fourth layer and the fiber direction of the fifth layer is 90°. This makes it easy to subject the parts of the fourth layer and the fifth layer to shear deformation and possible to easily manufacture a fiber-reinforced composite material having excellent mechanical properties while suppressing the generation of wrinkles.

As the laminated unit, a laminated unit 1 having a laminated configuration of [0°/90°/resin film (Y)/45°/135°] is particularly preferable as illustrated in FIG. 1 and FIGS. 2A to 2D since the mechanical properties of the fiber-reinforced composite material are the most equal. In other words, the laminated unit 1 in which a prepreg (X) 2, a prepreg (X) 3, a resin film (Y) 4, a prepreg (X) 5, and a prepreg (X) 6 are laminated in order from the first layer and θ1 that is the fiber direction of the prepreg (X) 3 is 90°, θ2 that is the fiber direction of the prepreg (X) 5 is 45°, and θ3 that is the fiber direction of the prepreg (X) 6 is 135° is particularly preferable.

Incidentally, the broken lines in FIGS. 2A to 2D mean the fiber directions of the reinforcing fibers.

The stack may be a single body of a laminated unit or one including two or more laminated units. In a case in which the stack includes two or more laminated units, the stack may be a stack in which the laminated units are laminated such that the resin film (Y) is sandwiched between the laminated units adjacent to each other in the thickness direction. In this case, the thickness of the resin film (Y) to be used in the laminated unit and the thickness of the resin film (Y) to be used between the laminated units may be the same as or different from each other.

The stack may be a stack which includes two laminated units having the same laminated configuration and in which the laminated units are laminated such that the respective laminated order thereof are symmetrical in the thickness direction. In other words, the stack may be a stack which includes two laminated units and in which the laminated order of one laminated unit and the laminated order of the other laminated unit are mirror symmetric with respect to the lamination planes of each other. Specifically, the stack may be a stack having, for example, a laminated configuration of [0°/θ1/resin film (Y)/θ2/θ3/resin film (Y)/θ3/θ2/resin film (Y)/θ1/0°]. In addition, the stack may be a stack which does not have the resin film (Y) between the laminated units or, for example, a stack having a laminated configuration of [0°/θ1/resin film (Y)/θ2/θ3/θ3/θ2/resin film (Y)/θ1/0°].

In addition, the stack may be a stack having a laminated configuration of [0°/θ1/resin film (Y)/θ2/θ3/θ2/resin film (Y)/θ1/0°].

<Prepreg (X)>

The prepreg (X) to be used in the stack is a sheet-shaped prepreg in which a plurality of consecutively arranged reinforcing fibers are impregnated with a matrix resin composition.

The form of the prepreg (X) may be a UD prepreg in which the reinforcing fibers are aligned in one direction or a cloth prepreg in which the reinforcing fibers are woven so as to cross each other at right angles. In addition, the prepreg (X) may be a prepreg using a reinforcing fiber fabric such as another bias cloth, triaxial cloth, or Multi-axial Warp Knit as a base material.

The thickness of the prepreg (X) is preferably from 0.03 to 1.0 mm and more preferably from 0.1 to 0.5 mm. The thicknesses of a plurality of prepregs (X) to be used in the stack may be all the same as or different from each other. In the stack including the laminated unit to be described later, it is preferable that the prepregs (X) of the first layer and the second layer have the same thickness and the prepregs (X) of the fourth layer and the fifth layer have the same thickness from the viewpoint of facilitating the control of shear deformation.

Examples of the reinforcing fiber to be used in the prepreg (X) may include a carbon fiber, a glass fiber, an aramid fiber, a high-strength polyester fiber, a boron fiber, an alumina fiber, a silicon nitride fiber, and a nylon fiber. Among these, a carbon fiber is preferable since it has an excellent specific strength and excellent specific elasticity.

Examples of the matrix resin composition may include those containing an epoxy resin, an unsaturated polyester resin, an acrylic resin, a vinyl ester resin, a phenol resin, and a benzoxazine resin. Among these, a resin composition containing an epoxy resin is preferable since it is possible to increase the strength after curing.

<Resin Film (Y)>

Examples of the resin composition for forming the resin film (Y) to be used in the stack may include those containing an epoxy resin, an unsaturated polyester resin, an acrylic resin, a vinyl ester resin, a phenol resin, and a benzoxazine resin. Among these, a resin composition containing an epoxy resin is preferable since it is possible to increase the strength after curing. The resin composition for forming the resin film (Y) may be the same as or different from the matrix resin composition for forming the prepreg (X). It is preferable to use a resin film (Y) having the same composition of resin as that of the matrix resin composition to be contained in the prepreg (X) from the viewpoint of adhesive property between the respective layers constituting the fiber-reinforced composite material to be obtained.

As the resin film (Y), it is also possible to use a sheet molding compound (SMC) in which short fibers of the reinforcing fibers are dispersed in the above resin composition. Examples of the kind of the reinforcing fiber to be used in the SMC may include the same ones as those mentioned in the prepreg (X). By using this SMC, it is possible to further improve the mechanical properties of the fiber-reinforced composite material obtained while maintaining the softening property at the time of molding.

It is preferable that the resin film (Y) is softened under the temperature conditions at the time of molding of the preform or the fiber-reinforced composite material so that the laminated parts (paired part) of the prepregs (X) divided by taking the resin film (Y) as the boundary can each move without being affected by each other at the time of molding.

Specifically, in the case of molding a stack including a laminated unit having a laminated configuration of [0°/θ1/resin film (Y)/θ2/θ3], it is preferable that the resin film (Y) is softened so that a paired part of the first layer and the second layer constituting the laminated configuration of [0°/θ1] and a paired part of the fourth layer and the fifth layer constituting the laminated configuration of [θ2/θ3] can each independently move without being affected by each other at the time of molding. This makes it easy to subject the paired part of the first layer and the second layer to shear deformation by slightly extending or stretching the paired part in the directions of 45° and 135° at the time of preparatory molding and compression molding. In addition, this makes it easy to subject the paired part of the fourth layer and the fifth layer to shear deformation by slightly extending or stretching the paired part in the direction of (θ3−θ2)/2 and the direction of (θ3−θ2)/2+90°. As a result, it is possible to easily mold even a stack in which reinforcing fibers are oriented in four or more axes without generating wrinkles.

By forming the resin film (Y) as a resin film having a composition of resin different from that of the matrix resin composition of the prepreg (X), it is also possible to control the degree of independence that the paired part of the first layer and the second layer and the paired part of the fourth layer and the fifth layer each independently move without being affected by each other at the time of molding.

The thickness of the resin film (Y) is preferably from 0.1 to 1.0 mm and more preferably from 0.15 to 0.7 mm. When the thickness of the resin film (Y) is equal to or thicker than the lower limit value, the degree of freedom that the paired part of the first layer and the second layer and the paired part of the fourth layer and the fifth layer each independently move without being affected by each other is improved. When the thickness of the resin film (Y) is equal to or thinner than the upper limit value, it is possible to suppress the generation of wrinkles. The thicknesses of the resin film (Y) to be used in the stack may be all the same as or different from each other.

(Manufacturing Method)

Examples of a method for manufacturing a fiber-reinforced composite material may include a method having the following steps (1) to (6).

(1) Two prepregs (X) are laminated such that the fiber direction of one prepreg (X) is 0° and the fiber direction of the other prepreg (X) is θ1. Provided that θ1 is set to from 85° to 95°.

(2) A resin film (Y) is laminated on the prepreg (X) having a fiber direction of θ1 in the laminate obtained in the step (1).

(3) A prepreg (X) is laminated on the resin film (Y) laminated in the step (2) such that the fiber direction thereof is θ2, and a prepreg (X) is further laminated thereon such that the fiber direction thereof is θ3, thereby obtaining a laminated unit having a five-layer configuration. Provided that θ2 is set to from 30° to 60° and θ3 is set to from 120° to 150°.

(4) If necessary, the laminated unit and the resin film (Y) are superposed on each other to form a stack.

(5) The stack obtained in the step (4) is subjected to preparatory molding to obtain a preform.

(6) The preform obtained in the step (5) is subjected to compression molding by a molding die equipped with a pair of dies to obtain a fiber-reinforced composite material having a three-dimensional shape.

When forming the stack by the steps (1) to (4), it is preferable to laminate the prepregs (X) and the resin film (Y) such that the air between the layers can be eliminated since it is easy to suppress deterioration of the mechanical properties of a fiber-reinforced composite material to be finally obtained. Examples of the method for eliminating the air may include a method in which the formed stack is compressed by a flat die to remove the air contained in the stack and a method in which the stack is covered with a bagging film and the interior of the bagging film is evacuated (hereinafter referred to as the "vacuum bag method"). Among these, the vacuum bag method is preferable since air can be efficiently eliminated.

The steps (1) to (4) are an example, and the procedure for laminating the individual prepreg (X) and the resin film (Y) is not limited. In addition, the step (4) is omitted in a case in which the stack is composed of one laminated unit.

Examples of the method for obtaining a preform by subjecting the stack to preparatory molding in the step (5) may include a method in which the stack is stuck by hands so as to be pressed against the molding die, a method in which the stack is disposed on a molding die, a rubber film or the like is disposed thereon, and the interior is then evacuated to pressure join the stack to the molding die, and a method in which the stack is compressed by a molding die composed of a pair of dies (male and female dies). Among these, the method in which the stack is compressed by a molding die is preferable since the preparatory molding is conducted in a short time. In this case, it is more preferable to utilize a stretchable resin or rubber sheet as to be described later.

Incidentally, the male and female dies mean a pair of dies in which the concave portion or convex portion of one die corresponds to the convex portion or concave portion of the other die.

The molding die to be used for preparatory molding may correspond to the shape of the fiber-reinforced composite material to be finally obtained but is not required to be in a shape complementary to the shape of the fiber-reinforced composite material. The material of the molding die to be used for preparatory molding is not particularly limited, but examples thereof may include a metal and chemical wood. Among these, chemical wood is preferable since the material is inexpensive and is easily processed.

In the preparatory molding, it is preferable to heat the stack if necessary. This softens the prepreg (X) and the resin film (Y). For example, when conducting preparatory molding of a laminated unit having a laminated configuration of [0°/θ1/resin film (Y)/θ2/θ3], the paired part of the first layer and the second layer and the paired part of the fourth layer and the fifth layer are likely to each independently move without being affected by each other and the degree of freedom that the paired parts each independently undergo shear deformation increases by softening the prepreg (X) and the resin film (Y). As a result, it is easy to conduct preparatory molding of even a stack in which reinforcing fibers are oriented in four or more axes without generating wrinkles.

Examples of the heating method of the stack may include a heating method by hot air and a heating method by infrared rays. As a heating method, a heating method by infrared rays is preferable from the viewpoint of being able to rapidly heat the laminate.

In the step (6), for example, the preform obtained in the step (5) is placed in a molding die provided with a clearance set according to the shape of the fiber-reinforced composite material and the preform is cured by being heated and pressurized at a predetermined temperature and a predetermined pressure using a pressing machine, thereby obtaining a fiber-reinforced composite material.

At this time, it is preferable that the temperature of the molding die is adjusted to a predetermined temperature in advance and the fiber-reinforced composite material is taken out from the molding die at that temperature after the compression molding. This eliminates the need for raising and lowering the temperature of the molding die, increases the molding cycle, and improves the productivity.

The method for manufacturing a fiber-reinforced composite material of the invention may be a method for obtaining a fiber-reinforced composite material by subjecting the stack to compression molding without conducting the preparatory molding in the step (5).

Figure 3A:
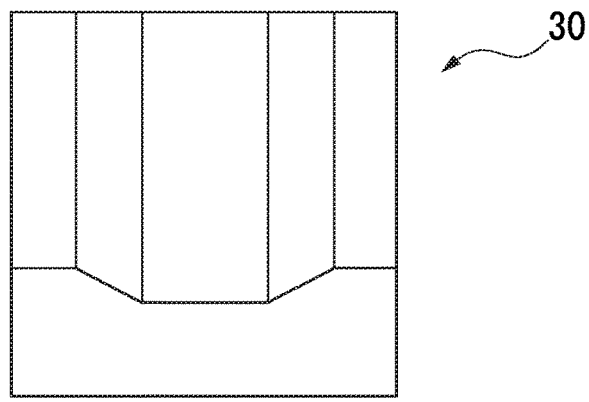
FIG. 3A is a plan view illustrating an example of a fiber-reinforced composite material to be manufactured by a manufacturing method of the invention.
Figure 3B:
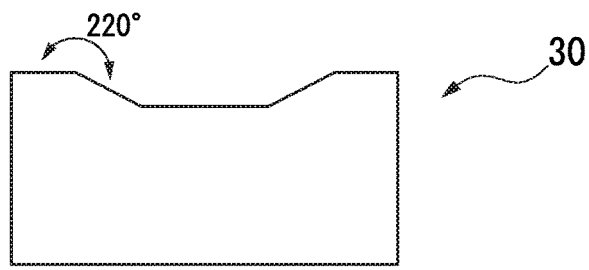
FIG. 3B is a front view of the fiber-reinforced composite material of FIG. 3A.
Figure 3C:
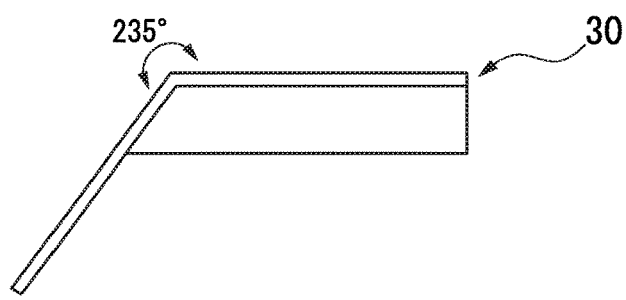
FIG. 3C is a side view of the fiber-reinforced composite material of FIG. 3A.
Figure 4:
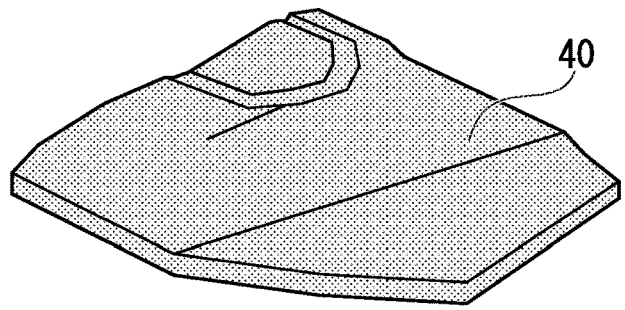
FIG. 4 is a perspective view illustrating an example of a fiber-reinforced composite material to be manufactured by a manufacturing method of the invention.

The shape of the fiber-reinforced composite material to be manufactured by the invention is not particularly limited. Examples of the shape of the fiber-reinforced composite material may include a shape having a curved surface (including a combination of a plurality of planes) which cannot be developed in a plane and is accompanied by shear deformation of each layer at the time of molding of a planar stack, namely a three-dimensional curved surface shape, such as a fiber-reinforced composite material 30 exemplified in FIGS. 3A to 3C or a fiber-reinforced composite material 40 exemplified in FIG. 4. In addition, the shape of the fiber-reinforced composite material may be a curved surface shape capable of being developed in a plane so as to be molded by being bent without causing shear deformation. The manufacturing method of the invention is particularly effective in the manufacture of a fiber-reinforced composite material having a three-dimensional curved surface shape, namely, in the case of molding the stack into a shape that cannot be developed in a plane.

In the preform and the fiber-reinforced composite material, the direction of 0° that is the fiber direction of the first layer of the stack may be directed in any direction and can be arbitrarily set.

As a fiber-reinforced composite material to be obtained by a manufacturing method using a stack including a laminated unit, one in which the following resin layers A to E are laminated in this order and the smallest angle is 45° or less among the angles formed by the fiber directions of the reinforcing fibers in a planar view between the respective two layers of the resin layers A, B, D, and E is preferable.

Resin layers A, B, D, and E: resin layers containing reinforcing fibers aligned in one direction.

Resin layer C: a resin layer which does not contain a reinforcing fiber aligned in one direction.

The smallest angle among the angles formed by the fiber directions of the reinforcing fibers in a planar view between the respective two layers of the resin layers A, B, D, and E is the smallest angle among the following angles α1 to α6.

Angle α1: the angle formed by the fiber direction of the reinforcing fiber of the resin layer A and the fiber direction of the reinforcing fiber of the resin layer B.

Angle α2: the angle formed by the fiber direction of the reinforcing fiber of the resin layer A and the fiber direction of the reinforcing fiber of the resin layer D.

Angle α3: the angle formed by the fiber direction of the reinforcing fiber of the resin layer A and the fiber direction of the reinforcing fiber of the resin layer E.

Angle α4: the angle formed by the fiber direction of the reinforcing fiber of the resin layer B and the fiber direction of the reinforcing fiber of the resin layer D.

Angle α5: the angle formed by the fiber direction of the reinforcing fiber of the resin layer B and the fiber direction of the reinforcing fiber of the resin layer E.

Angle α6: the angle formed by the fiber direction of the reinforcing fiber of the resin layer D and the fiber direction of the reinforcing fiber of the resin layer E.

This fiber-reinforced composite material has the resin layer C which does not contain a reinforcing fiber aligned in one direction, and thus it has an excellent appearance and can have a complicated three-dimensional shape.

As the fiber-reinforced composite material having the resin layers A to E, it is preferable that the fiber directions of the reinforcing fibers of the resin layer B, the resin layer D, and the resin layer E are each from 15° to 165° when the fiber direction of the reinforcing fiber of the resin layer A is taken as 0° from the viewpoint of obtaining superior mechanical properties.

In addition, it is preferable that the smallest angle among the angles α1 to α6 is from 15° to 45° from the viewpoint of obtaining superior mechanical properties.

In addition, the method for manufacturing a fiber-reinforced composite material of the invention is preferably the following method from the viewpoint of easily suppressing appearance defects such as fiber meandering and wrinkles. Upon manufacturing a fiber-reinforced composite material having a three-dimensional shape from a stack in which prepregs (X) are laminated such that the fiber directions thereof are different from each other by using a molding die equipped with a pair of dies, a pair of the dies are brought close to each other in a state in which a stretchable resin or rubber sheet is disposed between one die of a pair of the dies and the stack while being tensioned in a specific direction and the stack is molded by a pair of the dies while extending the stretchable sheet.

The method for manufacturing a fiber-reinforced composite material of the present embodiment is a method suitable for manufacturing a preform by subjecting the stack to preparatory molding by a molding die equipped with a pair of dies prior to obtaining of a fiber-reinforced composite material by compression molding of the stack including the prepreg (X).

In addition, the method for manufacturing a fiber-reinforced composite material of the present embodiment can be combined with a method in which a stack including the resin film (Y) described above.

In the present embodiment, a pair of the dies are brought close to each other in a state in which a stretchable resin or rubber sheet is disposed between one die of a pair of dies of a molding die and the stack while being tensioned in a specific direction and the stack is molded by a pair of the dies while extending the stretchable sheet. The stack is pulled toward the outside of the molding die to follow the extension of the stretchable sheet as the stretchable sheet is extended at the time of molding in this manner. This makes it easy for the reinforcing fibers in the stack to follow the deformation in the direction in which the reinforcing fibers are not oriented, and the generation of appearance defects such as fiber meandering and generation of wrinkles in the preform and the reinforced-fiber composite material is thus suppressed.

Examples of an aspect of the manufacturing method of the present embodiment may include an aspect in which molding is conducted as follows by using an upper die and a lower die which are equipped with a molding surface capable of molding the stack into a desired shape by sandwiching and pressurizing the stack as a pair of dies of a molding die. A stretchable sheet is disposed while being tensioned such that the stretchable sheet partly comes into contact with a part of the molding surface of the lower die facing the upper die and a stack is molded by bringing the upper die and the lower die close to each other in a state in which the stack is disposed on the stretchable sheet. In such an aspect, it is possible to more stably conduct the molding of a stack and it is easy to suppress the generation of appearance defects such as fiber meandering and generation of wrinkles in the preform or the reinforced fiber composite material.

In the present embodiment, it is preferable to use a stretchable sheet having a size larger than that of the stack. In this case, with regard to the die closer to the stretchable sheet of the molding die, it is preferable that the outside of the molding surface for molding the stack in a planar view is also equipped with a planar region with which the stretchable sheet comes into contact in order to sufficiently extend the stretchable sheet.

In the method for manufacturing a fiber-reinforced composite material of the present embodiment, it is preferable to conduct molding by disposing the stretchable sheet at the part at which particularly great shear deformation is caused in the stack at the time of molding. Specifically, it is preferable that molding simulation is conducted based on the three-dimensional CAD data for the shape of the intended preform, a stretchable sheet is disposed at the part at which the calculated stress value (Von Mises Stress) is 100 MPa or more, and molding is conducted. For example, nonlinear analysis software (product name: LS-DYNA developed by Livermore Software Technology Corporation) can be used for molding simulation.

As a specific example of the manufacturing method of the invention, for example, an aspect using a molding die 100 exemplified in FIG. 5 will be described. The molding die 100 is used for manufacture of a preform.

The molding die 100 is equipped with a lower die 110 and an upper die 112. In the molding die of this example, the lower die 110 is a fixed die and the upper die 112 is a movable die.

The lower die 110 is equipped with a main body portion 114 having a substantially oblong shape as a planar view shape and two convex portions 116 and 118 provided side by side in the longitudinal direction on the upper surface of the main body portion 114. A concave portion 120 is formed between the convex portion 116 and the convex portion 118 on the upper surface of the main body portion 114 of the lower die 110. The convex portion 116 has a rectangular shape as a planar view shape, a trapezoidal shape as a front view shape, and a shape in which the upper portion of a quadrangular pyramid is horizontally cut out. The shape of the convex portion 118 is the same as the shape of the convex portion 116.

In the lower die 110, the surface on the front side and the part near the concave portion 120 on the upper surface of the convex portion 116, the surface of the concave portion 120, the part corresponding to the concave portion 120 in the main body portion 114, and the surface on the front side and the part near the concave portion 120 on the upper surface of the convex portion 118 form a molding surface 122 for molding the stack.

The lower die 110 is provided with a plurality of screw holes 111.

The upper die 112 is equipped with a main die 124 and a sub die 126.

The main die 124 is a member for pressurizing and molding a stack in a state of sandwiching the stack with the lower die 110 and is a part at which particularly great shear deformation is caused to the stack in the upper die 112. A molding surface 128 having an irregular shape complementary to the part on the front side of the molding surface 122 of the lower die 110 is formed at the part on the bottom side of the main die 124.

The sub die 126 is a member for molding a stack together with the main die 124 and is a part which functions as a fixing jig for fixing the stretchable sheet and the stack so that these are not displaced at the time of molding. A molding surface 130 having an irregular shape complementary to the part on the back side of the molding surface 122 of the lower die 110 is formed at the part of the bottom side of the sub die 126.

In the sub die 126, a plurality of through holes 127 are provided at the positions corresponding to the screw holes 111 provided to the lower die 110. The sub die 126 can be fixed on the lower die 110 by allowing a screw (not illustrated) to pass through the through hole 127, screwing the screw into the screw hole 111 provided to the lower die 110, and fastening the screw in a state in which the sub die 126 is brought close to the lower die 110.

The die material of the molding die is not particularly limited, and examples thereof may include a metal, gypsum, and chemical wood. Among these, chemical wood is preferable from the viewpoint of cost and processability.

The manufacture of a preform using the molding die 100 is conducted, for example, by the following method.

Figure 6:
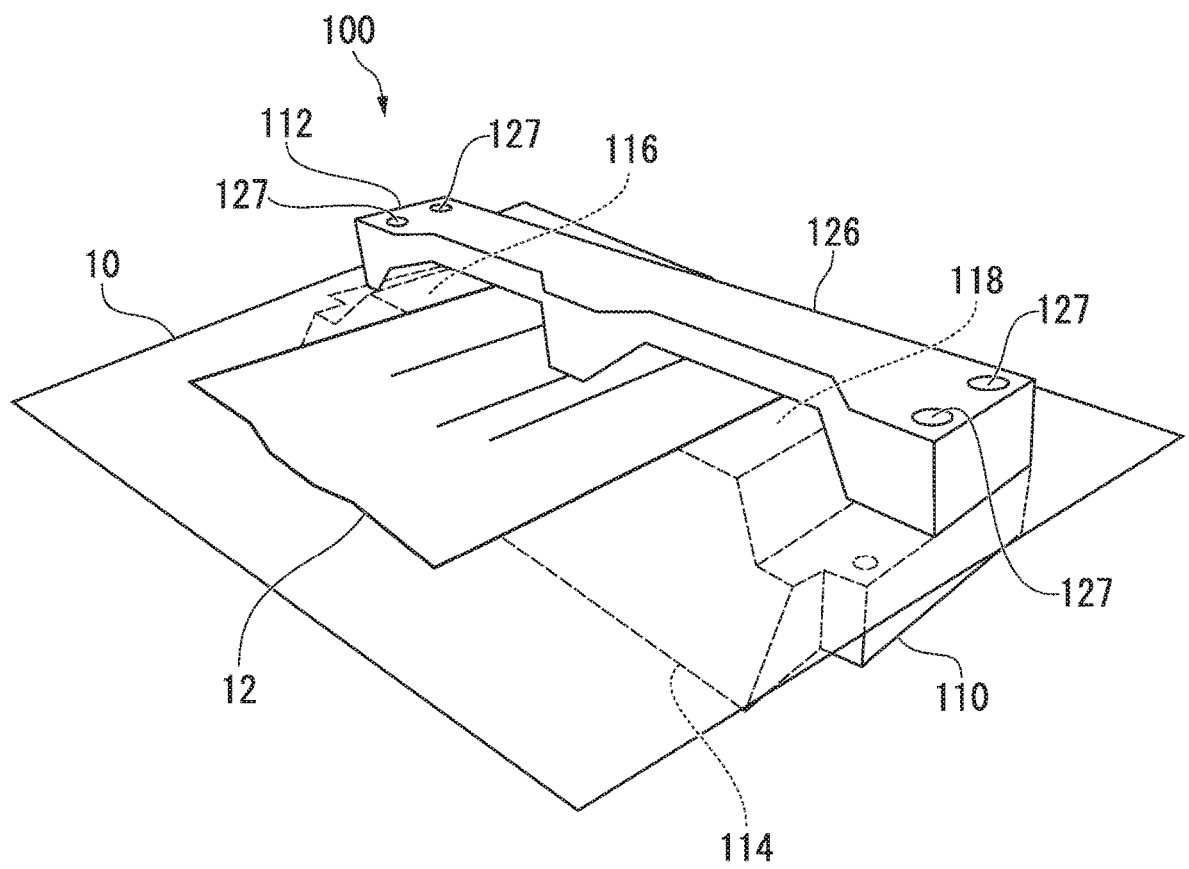
FIG. 6 is a perspective view illustrating a step in a method for manufacturing a fiber-reinforced composite material of the invention.

As illustrated in FIG. 6, a stretchable sheet 10 is disposed on the lower die 110 so as to cover the entire molding surface 122. Subsequently, a stack 12 is disposed on the stretchable sheet 10, the sub die 126 of the upper die 112 is then placed on the part on the back side on the upper surface of the lower die 110, and the stretchable sheet 10 and the stack 12 are fixed so as not to be displaced.

Figure 7:
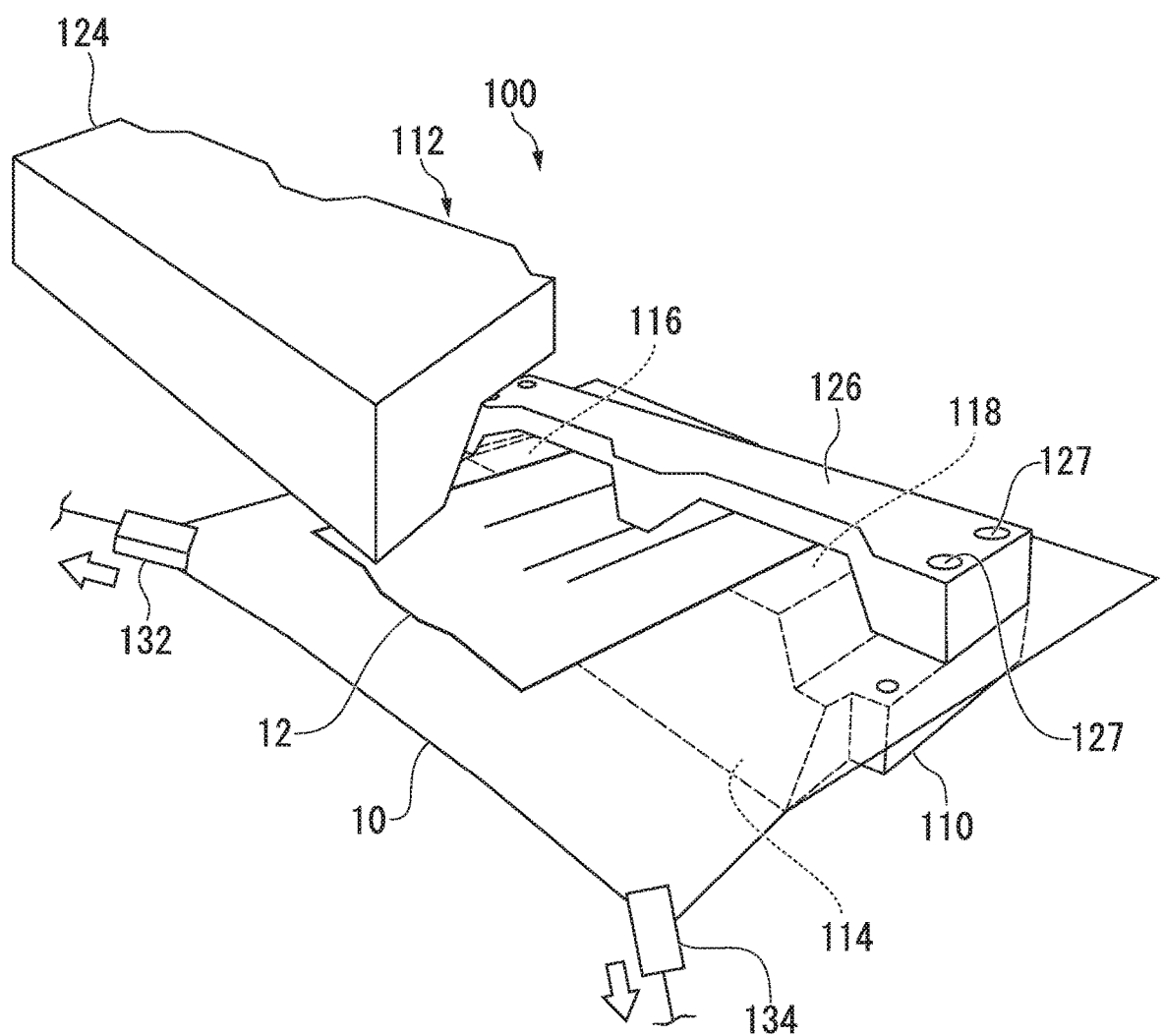
FIG. 7 is a perspective view illustrating a step in a method for manufacturing a fiber-reinforced composite material of the invention.

Subsequently, as illustrated in FIG. 7, the stretchable sheet 10 is gripped by clamps 132 and 134 equipped to the tensile force applying means, a tensile force is applied to the stretchable sheet 10, and the stretchable sheet 10 is tensioned such that the stretchable sheet 10 partly comes into contact with the upper surfaces of the convex portion 116 and the convex portion 118.

When the stretchable sheet is tensioned by applying a tensile force thereto, it is preferable to extend the stretchable sheet. It is preferable that the extended ratio of the stretchable sheet in this case is adjusted such that the deformation does not exceed the elastic region of the stretchable sheet when the stretchable sheet is extended by the lower die 110 and the upper die 112 at the time of molding. This makes it easy to sufficiently obtain an effect of suppressing the generation of appearance defects such as fiber meandering and generation of wrinkles in the preform.

The direction in which the tensile force is applied to the stretchable sheet is not particularly limited as long as the stretchable sheet is uniformly tensioned so that wrinkles or relaxed parts are not generated on the stretchable sheet. For example, in a state as illustrated in FIG. 7, it is preferable that the stretchable sheet 10 is fixed to the clamps 132 and 134 and the stretchable sheet 10 is extended in the direction of the arrow illustrated in FIG. 7.

In addition, it is preferable that the direction in which the tensile force is applied to the stretchable sheet is as close as possible to the direction of the plane perpendicular to the direction in which a pair of dies are combined, namely, the direction (horizontal direction) in which the contact area between the upper surfaces of the convex portion 116 and the convex portion 118 of the lower die 110 and the stretchable sheet is as large as possible in a case as FIG. 7. This makes it easy to uniformly extend the stretchable sheet by the lower die and the upper die at the time of molding, and it is thus easy to obtain an effect of suppressing the generation of appearance defects such as fiber meandering and generation of wrinkles in the preform.

In this case, the angle formed by the direction in which a tensile force is applied to the stretchable sheet and the horizontal direction is preferably 45° or less and more preferably 1° or less.

Subsequently, the stack 12 is heated to soften the matrix resin composition contained in the stack 12. At this time, the stretchable sheet 10 and the lower die 110 may also be heated at the same time.

The heating temperature of the stack may be a temperature at which the matrix resin composition softens, and varies depending on the kind of the matrix resin composition, but is preferably from 65° C. to 80° C. and more preferably from 70° C. to 75° C. When the heating temperature of the stack is equal to or higher than the lower limit value, the matrix resin composition softens and the reproducibility of the shape of the preform based on the molding die is favorable. When the heating temperature of the stack is equal to or lower than the upper limit value, it is easy to suppress the initiation of curing of the matrix resin composition during molding of the preform.

A method for heating the stack is not particularly limited, and examples thereof may include heating by an infrared heater, heating by hot air, and heating by electric current application to the prepreg.

Figure 8:
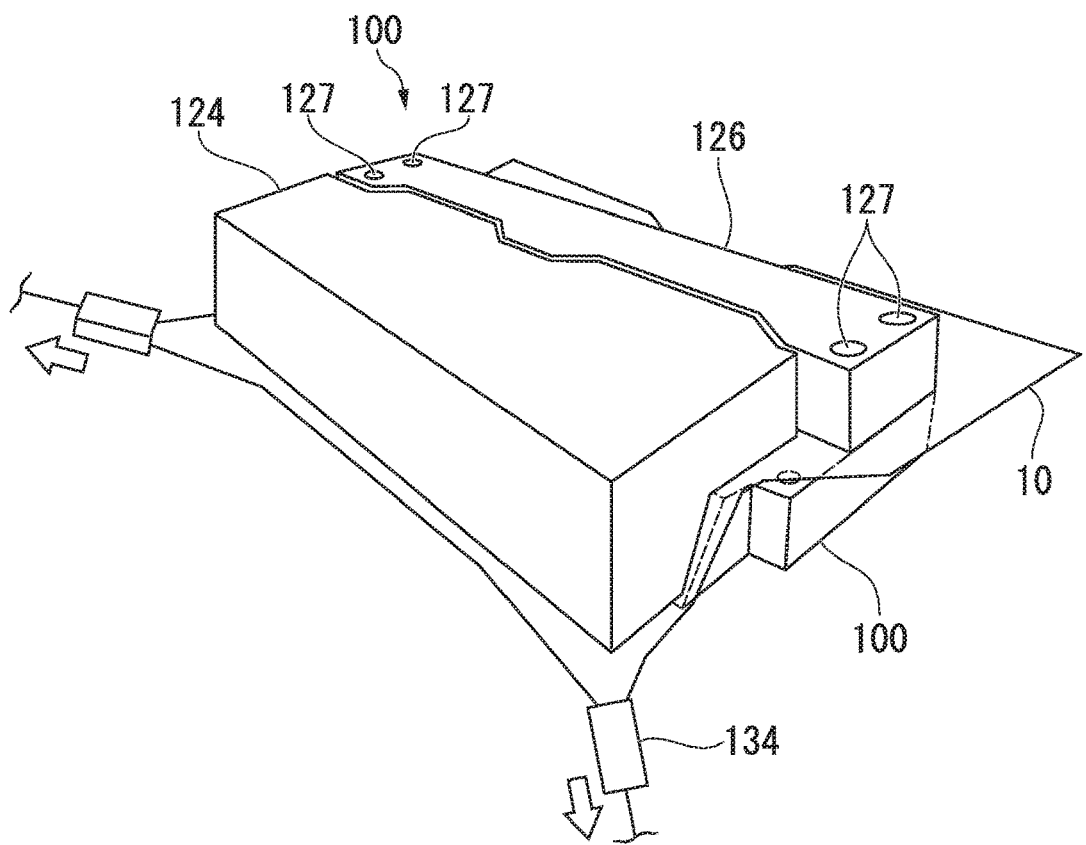
FIG. 8 is a perspective view illustrating a step in a method for manufacturing a fiber-reinforced composite material of the invention.

Subsequently, as illustrated in FIG. 8, in a state in which the stack 12 is heated, the main die 124 of the upper die 112 is brought close to the part on the front side of the lower die 110 and the stretchable sheet 10 and the stack 12 are sandwiched between the lower die 110 and the upper die 112 and pressurized for preparatory molding. At this time, the stack 12 is molded by the lower die 110 and the upper die 112 while extending the stretchable sheet 10 as the stretchable sheet 10 is being tensioned. By this, the stack 12 follows the extension of the stretchable sheet 10 and is pulled toward the outside of the die (in this example, the front side of the die), and the reinforcing fiber in the stack 12 easily follows the deformation. Hence, the generation of appearance defects such as fiber meandering and generation of wrinkles in the preform to be obtained is suppressed.

The surface pressure at the time of preparatory molding of the stack is preferably from 0.01 to 0.1 Mpa and more preferably from 0.03 to 0.04 Mpa. The stack can sufficiently follow the shape when the surface pressure is equal to or higher than the lower limit value. It is easy to suppress spreading of the reinforcing fiber at the stage of preparatory molding when the surface pressure is equal to or lower than the upper limit value.

Figure 9:
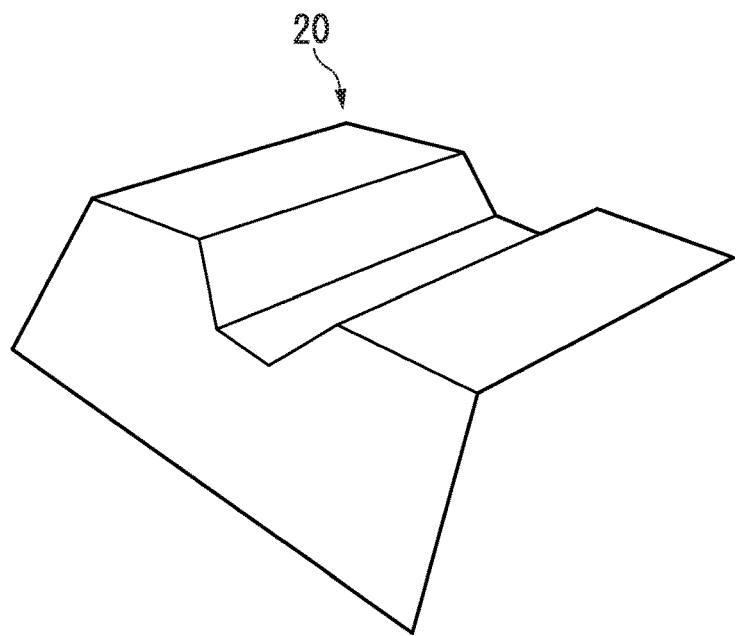
FIG. 9 is a perspective view illustrating a step in a method for manufacturing a fiber-reinforced composite material of the invention.

After molding, a preform 20 is cooled, the upper die 112 is separated from the lower die 110 and then removed from the lower die 110, whereby the preform 20 illustrated in FIG. 9 is obtained. In the case of focusing on the mass productivity of the preform 20, it is preferable to keep the tensile force applied to the stretchable sheet 10 as it is even when removing the preform 20 from the die. Meanwhile, in the case of focusing on the precision of the shape of the preform 20, the tensile force applied to the stretchable sheet 10 may be appropriately released when removing the preform 20 from the die.

The temperature of the preform when being detached from the lower die is preferably 30° C. or lower and more preferably 23° C. or lower.

The method for cooling the preform is not particularly limited, and the preform can be cooled, for example, by being left to cool.

In the present embodiment, it is preferable to mold the stack in a state in which the stretchable sheet is tensioned in one or more directions so that the angle φ formed by the fiber direction of each prepreg (X) in the stack and the direction in which the stretchable sheet is tensioned is from 15° to 75°.

By setting the angle φ to 15° or more, sufficient moldability tends to be easily obtained even if the shape of the fiber-reinforced composite material to be finally obtained is complicated. The angle φ is more preferably 30° or more.

In addition, by setting the angle φ to 75° or less, meandering of the reinforcing fiber and splitting of the prepreg at the time of molding of the stack tend to be easily prevented. The angle φ is more preferably 60° or less.

Furthermore, in the aspect utilizing a stretchable sheet, it is more preferable that the tensioned state of the stretchable sheet is uniformly maintained at the time of molding of the stack, and it is thus more preferable to mold the stack while maintaining the state in which the stretchable sheet is tensioned in two or more directions.

Incidentally, the shape of the preform after the preparatory molding using a stretchable sheet is not completely conform to the shape of the molding surface of the molding die in some cases, but in such a case, the primary molded product after the first molding using a stretchable sheet may be molded again by using a pair of dies in a state in which the stretchable sheet is not disposed to regulate the shape of the preform if necessary.

Figure 10:
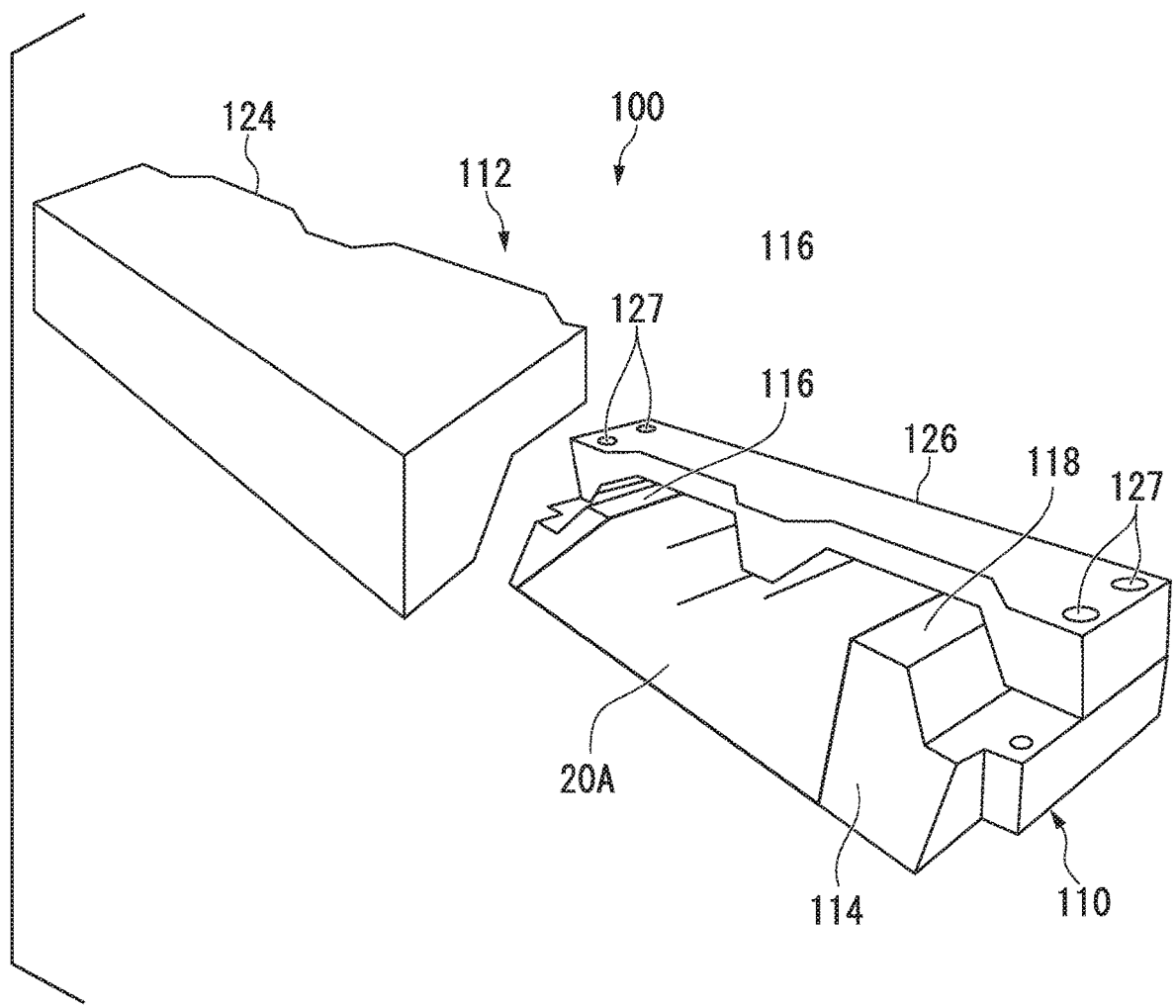
FIG. 10 is a perspective view illustrating a step in a method for manufacturing a fiber-reinforced composite material of the invention.

For example, in the case of using the molding die 100, as illustrated in FIG. 10, a primary molded product 20A removed from the lower die 110 after molding using the stretchable sheet 10 is disposed on the lower die 110 on which the stretchable sheet 10 is not disposed. Subsequently, the sub die 126 of the upper die 112 is placed on the part on the back side on the upper surface of the lower die 110, and the primary molded product 20A is fixed so as not to be displaced.

Subsequently, the primary molded product 20A is heated to soften the matrix resin composition in the primary molded product 20A. At this time, the lower die 110 may also be heated at the same time.

The heating temperature of the primary molded product may be a temperature at which the matrix resin composition softens, and varies depending on the kind of the matrix resin composition, but is preferably from 65° C. to 80° C. and more preferably from 70° C. to 75° C. When the heating temperature of the primary molded product is equal to or higher than the lower limit value, the matrix resin composition softens and the reproducibility of the shape of the preform based on the molding die is favorable. When the heating temperature of the primary molded product is equal to or lower than the upper limit value, it is easy to suppress the initiation of curing of the matrix resin composition during molding of the preform.

The method for heating the primary molded product is not particularly limited, and examples thereof may include the same method as the method for heating the stack.

Subsequently, in the same manner as in the case of the first molding using the stretchable sheet 10, the main die 124 of the upper die 112 is brought close to the part on the front side of the lower die 110 and the primary molded product 20A is sandwiched between the lower die 110 and the upper die 112 and pressurized to be molded in a state in which the primary molded product 20A is heated.

The surface pressure at the time of molding of the primary molded product is preferably from 0.01 to 0.1 Mpa and more preferably from 0.03 to 0.04 Mpa. The primary molded product can sufficiently follow the shape when the surface pressure is equal to or higher than the lower limit value. It is possible to suppress spreading of the reinforcing fiber at the stage of molding when the surface pressure is equal to or lower than the upper limit value.

After molding, the preform 20 is cooled, the upper die 112 is separated from the lower die 110 and the preform 20 (secondary molded product) is removed from the lower die 110.

The temperature of the preform (secondary molded product) when being detached from the lower die is preferably 30° C. or lower and more preferably 23° or lower.

The method for cooling the preform (secondary molded product) is not particularly limited, and the preform can be cooled, for example, by being left to cool.

The preform obtained by the method described above is placed in a molding die provided with a clearance set according to the shape of the fiber-reinforced composite material and heated and pressurized at a predetermined temperature and a predetermined pressure using a pressing machine, thereby obtaining a fiber-reinforced composite material. It is preferable that the temperature of the molding die to be used for compression molding is adjusted to a predetermined temperature in advance and the fiber-reinforced composite material is taken out from the molding die at that temperature after the compression molding. This eliminates the need for raising and lowering the temperature of the molding die, increases the molding cycle, and improves the productivity.

(Stack)

The stack to be used in the manufacturing method of the present embodiment is a laminate in which two or more sheet-shaped prepregs (X) in which reinforcing fibers are impregnated with a matrix resin composition are laminated so that the fiber directions thereof are different from each other.

The reinforcing fiber is not particularly limited, and it is possible to use, for example, an inorganic fiber, an organic fiber, a metal fiber, or a reinforcing fiber having a hybrid configuration in which these are combined.

Examples of the inorganic fiber may include a carbon fiber, a graphite fiber, a silicon carbide fiber, an alumina fiber, a tungsten carbide fiber, a boron fiber, and a glass fiber. Examples of the organic fiber may include an aramid fiber, a high-density polyethylene fiber, other general nylon fibers, and a polyester fiber. Examples of the metal fiber may include fibers of stainless steel and iron, and the metal fiber may be a carbon fiber covered with a metal. Among these, a carbon fiber is preferable when taking account of the mechanical properties such as the strength of the fiber-reinforced composite material.

Examples of the form of the reinforcing fiber base material to be impregnated with the matrix resin composition may include a form in which a large number of reinforcing fibers (long fibers) are aligned in one direction to form a UD sheet (unidirectional sheet) and a form in which reinforcing fibers (long fibers) are woven into a cloth material (woven fabric).

As this UD sheet, one in which a prepreg is prepared by impregnating reinforcing fibers aligned in one direction with a matrix resin composition and the reinforcing fibers in the prepreg are then cut shortly by making cuts into the prepreg may be used. In this case, the fiber length of the reinforcing fiber between the cuts is preferably set to be in a range of from 10 to 100 mm. When the fiber length of the reinforcing fiber is equal to or longer than the lower limit value, the mechanical properties of the fiber-reinforced composite material manufactured by using the preform thus obtained are likely to be sufficiently high. In addition, when the fiber length of the reinforcing fiber is equal to or shorter than the upper limit value, the stack is easily molded into a complicated shape such as a three-dimensional shape.

As the stack, one in which reinforcing fibers are aligned in two directions is preferable. Specifically, a laminate of prepregs (X) in which a plurality of prepregs (UD prepregs) in which reinforcing fibers aligned in one direction are impregnated with a matrix resin composition are laminated such that the direction of the fiber axis is two directions is preferable. In addition, a stack using a cloth prepreg in which reinforcing fibers are woven in two axial directions as the prepreg (X) is also preferable.

In the case of using a stack in which a plurality of UD prepregs are laminated, it is preferable to dispose the UD sheet such that the reinforcing fibers are aligned in two directions since the mesh opening and the fiber meandering at the time of preparatory molding further decrease, the moldability of the preform (followability to the molding die) is favorable, and a preform having a superior appearance tends to be manufactured. In this case, the angle formed by the fiber axes of the reinforcing fibers aligned in two directions is preferably from 60° to 120° and more preferably from 80° to 100°. A typical example of the angle is 90°.

Even in the case of using a cloth prepreg as the prepreg (X), it is preferable that the reinforcing fibers are aligned in substantially two directions as the whole stack for the same reason as above.

In other words, examples of the weaving method of the cloth material constituting the cloth prepreg may include plain weave, twill weave, satin weave, and triaxial weave. Among these, it is preferable to use a cloth material of plain weave, twill weave, or satin weave, in which reinforcing fibers are woven in two axial directions since a preform having a superior appearance tends to be manufactured.

As the matrix resin composition, a thermosetting resin composition may be used or a thermoplastic resin composition may be used. Among these, the matrix resin is preferably a thermosetting resin from the viewpoint of excellent rigidity of the fiber-reinforced composite material.

Examples of the thermosetting resin may include an epoxy resin, a vinyl ester resin, an unsaturated polyester resin, a polyimide resin, a maleimide resin, a phenol resin, and an acrylic resin. in the case of using a carbon fiber as the reinforcing fiber, an epoxy resin or a vinyl ester resin is preferable from the viewpoint of adhesiveness with the carbon fiber.

Examples of the thermoplastic resin may include a polyamide resin, an acrylonitrile.butadiene.styrene (ABS) resin, an acrylonitrile.ethylene-propylene-diene.styrene (AES) resin, and an acrylonitrile.styrene.acrylate (ASA) resin.

The matrix resin composition may be used singly, or two or more kinds thereof may be used concurrently.

A flame retardant material may be blended into the matrix resin composition if necessary.

Examples of this flame retardant material may include a bromine-based compound, a compound containing phosphorus and nitrogen, a phosphorus-based compound, a metal hydroxide, a silicone-based compound, and a hindered amine compound.

The weight resin content (R. C.) in the stack is preferably from 10 to 60 mass % and more preferably from 30 to 40 mass %. When R. C. is equal to or more than the lower limit value, the mechanical properties of the fiber-reinforced composite material manufactured by using the preform thus obtained are likely to be sufficiently high. When R. C. is equal to or less than the upper limit value, it is easy to mold the stack into a complicated shape such as a three-dimensional shape.

Incidentally, R. C. means a value measured by the measuring method described in JIS K 7071 5.1 or the like.

(Stretchable Sheet)

The stretchable sheet is a sheet which is formed of a resin or rubber and exhibits stretchability.

As the stretchable sheet, it is preferable to select one of which the deformation does not exceed the elastic region when being extended by a molding die in the state of being disposed between one die of the molding die and the stack while being tensioned according to the shape of the molding die.

Examples of the stretchable resin sheet may include a flexible polyvinyl chloride sheet, a flexible polyolefin sheet, and an ester-based urethane sheet.

Examples of the stretchable rubber sheet may include a silicone rubber sheet, a natural rubber sheet, and a nitrile rubber sheet.

As the stretchable sheet, one exhibiting high adhesive property to the stack is preferable. This makes it easy to suppress that the stack on the stretchable sheet slips and hardly follows when the stretchable sheet is extended by the molding die at the time of molding.

The thickness of the stretchable sheet is preferably set to be in a range of from 0.01 mm to 10 mm. This is because the stretchable sheet is hardly broken during molding of the stack by setting the thickness of the stretchable sheet to 0.01 mm or more. A more preferred thickness of the stretchable sheet is 0.1 mm or more. In addition, this is because a preform having a shape corresponding to the molding die tends to be obtained by setting the thickness of the stretchable sheet to 10 mm or less. A more preferred thickness of the stretchable sheet is 2 mm or less.

In addition, the modulus of elasticity in tension of the stretchable sheet is preferably set to be in a range of from 0.1 to 40 MPa. This is because a tensile force can be applied to the stack during molding and wrinkles and the like tend to be hardly generated in the preform to be obtained by setting the modulus of elasticity in tension of the stretchable sheet to 0.1 MPa or more. The modulus of elasticity in tension of the stretchable sheet is more preferably 10 MPa or more. In addition, this is because an excessive increase in the surface pressure of the stack at the time of molding is suppressed, flexible movement of the stretchable sheet is obtained, and the fiber meandering of the preform hardly occurs by setting the modulus of elasticity in tension of the stretchable sheet to 40 MPa or less. The modulus of elasticity in tension of the stretchable sheet is more preferably 20 MPa or less.

Incidentally, the modulus of elasticity in tension is a value measured according to JIS K 6251.

Furthermore, by using one of which the product (thickness [mm]×modulus of elasticity in tension [MPa]) of the thickness and the modulus of elasticity in tension is in a range of 1 to 6 as the stretchable sheet to be used in the present embodiment, it is easy to stably manufacture a preform having a favorable appearance and excellent shape uniformity. This is because a proper tensile force tends to be uniformly applied to the stack at the time of molding by setting this value to 1 or more. The product of the thickness and the modulus of elasticity in tension is more preferably 2 or more. In addition, this is because shear deformation that is required and sufficient for preparatory molding of the preform tends to be imparted to the stack as the stretchable sheet flexibly expands and contracts by setting the product of the thickness and the modulus of elasticity in tension to 6 or less. The product of the thickness and the modulus of elasticity in tension is more preferably 4 or less.

As described above, the method for manufacturing a fiber-reinforced composite material of the present embodiment is one in which a stack is molded by a molding die while extending a stretchable sheet in a state in which the stretchable sheet is disposed between one die of the molding die and the stack while being tensioned in a specific direction. The manufacturing method of the present embodiment is useful particularly in the case of temporarily manufacturing a preform by preparatory molding. In the present embodiment, the stretchable sheet is extended and the stack follows the stretchable sheet and is pulled toward the outside of the die, and the reinforcing fibers in the stack are thus more likely to follow the deformation in the direction in which the reinforcing fibers are not oriented. As a result, the generation of appearance defects such as fiber meandering and generation of wrinkles in the fiber-reinforced composite material is suppressed.

In addition, in the method for manufacturing a fiber-reinforced composite material of the present embodiment, it is not required to grip the stack each time to apply a tensile force and the generation of damage of the stack due to gripping is thus suppressed. In addition, it is possible to continuously mold a plurality of stacks while maintaining a state in which the stretchable sheet is tensioned and thus to manufacture a preform and the like with high productivity.

Incidentally, the method for manufacturing a fiber-reinforced composite material of the present embodiment is not limited to the method using the molding die 100 described above.

The method for manufacturing a fiber-reinforced composite material of the present embodiment may be a method for obtaining a preform and a fiber-reinforced composite material which have a two-dimensional curved surface shape but are not accompanied by shear deformation.

Hereinafter, the invention will be specifically described with reference to Examples, but the invention is not limited by the following description.

EXAMPLE 1

In the present Example, a fiber-reinforced composite material 30 which had a three-dimensional shape (a three-dimensional curved surface shape constituted by combining planes) which was not able to be developed in a plane and of which the stack was illustrated in FIG. 3 was manufactured. The following prepreg (X1) was used as the prepreg (X) and the following resin film (Y1) was used as the resin film (Y).

Prepreg (X1): sheet-shaped UD prepreg (product name: TR391E250S manufactured by Mitsubishi Rayon Co., Ltd.) obtained by aligning carbon fibers in one direction and impregnating the aligned carbon fibers with an epoxy resin composition.

Resin film (Y1): resin film obtained by adjusting to the temperature of the same epoxy resin composition (resin name: #391 manufactured by Mitsubishi Rayon Co., Ltd.) as that contained in the prepreg (X1) to 60° C., and forming the epoxy resin composition into a film so as to have a thickness of 0.3 mm by using a coater.

As illustrated in FIGS. 2A to 2D, the prepreg (X1) was cut and four prepregs (X) 2, 3, 5 and 6 each having a size of 250 mm in length×250 mm in width and a fiber direction of 0°, 90°, 45°, or 135° were obtained.

Subsequently, the resin film (Y1) was cut so as to have a size of 250 mm in length×250 mm in width, thereby obtaining a resin film (Y) 4.

Figure 11:
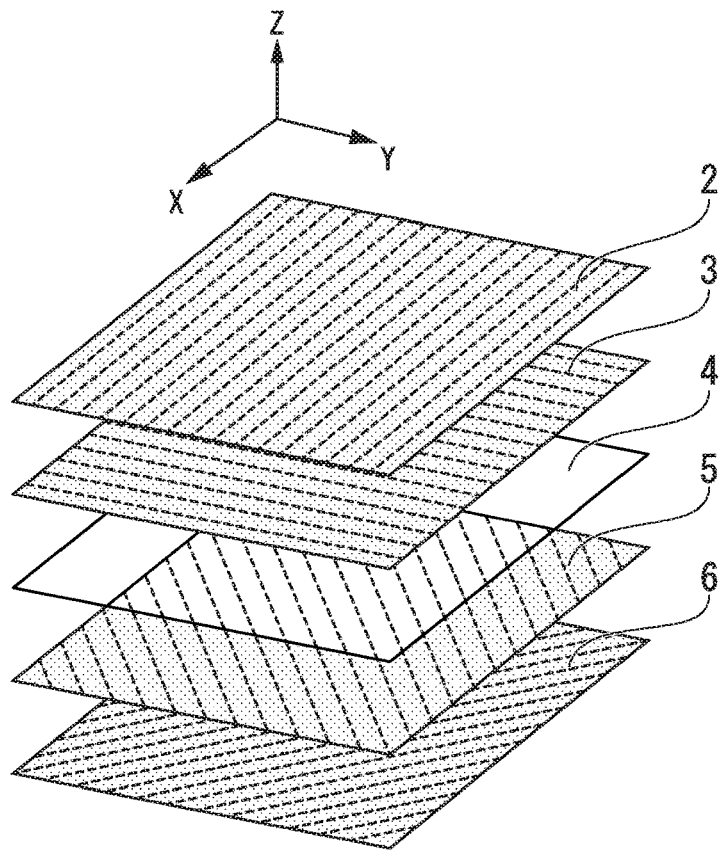
FIG. 11 is a view illustrating a step in an exemplary embodiment of the fabrication of a preform.

Subsequently, as illustrated in FIG. 11, the four prepregs (X) 2, 3, 5, and 6 after cutting and the resin film (Y) 4 after cutting were laminated by fitting the positions of the four sides of the respective prepregs so as to have a laminated configuration of [0°/90°/resin Film (Y1)/45°/135°], thereby obtaining a laminated unit 1. In other words, the laminated unit 1 was obtained by laminating the four prepregs (X) 2, 3, 5, and 6 and the resin film (Y) 4 so as to have a laminated configuration of prepreg (X) 2/prepreg (X) 3/resin film (Y) 4/prepreg (X) 5/prepreg 6 in order from the top.

Subsequently, the laminated unit 1 was put on a flat surface and covered with a bagging film, and the interior of the bagging film was evacuated for 45 minutes to eliminate the air between the respective layers, thereby forming a stack 12.

Figure 5:
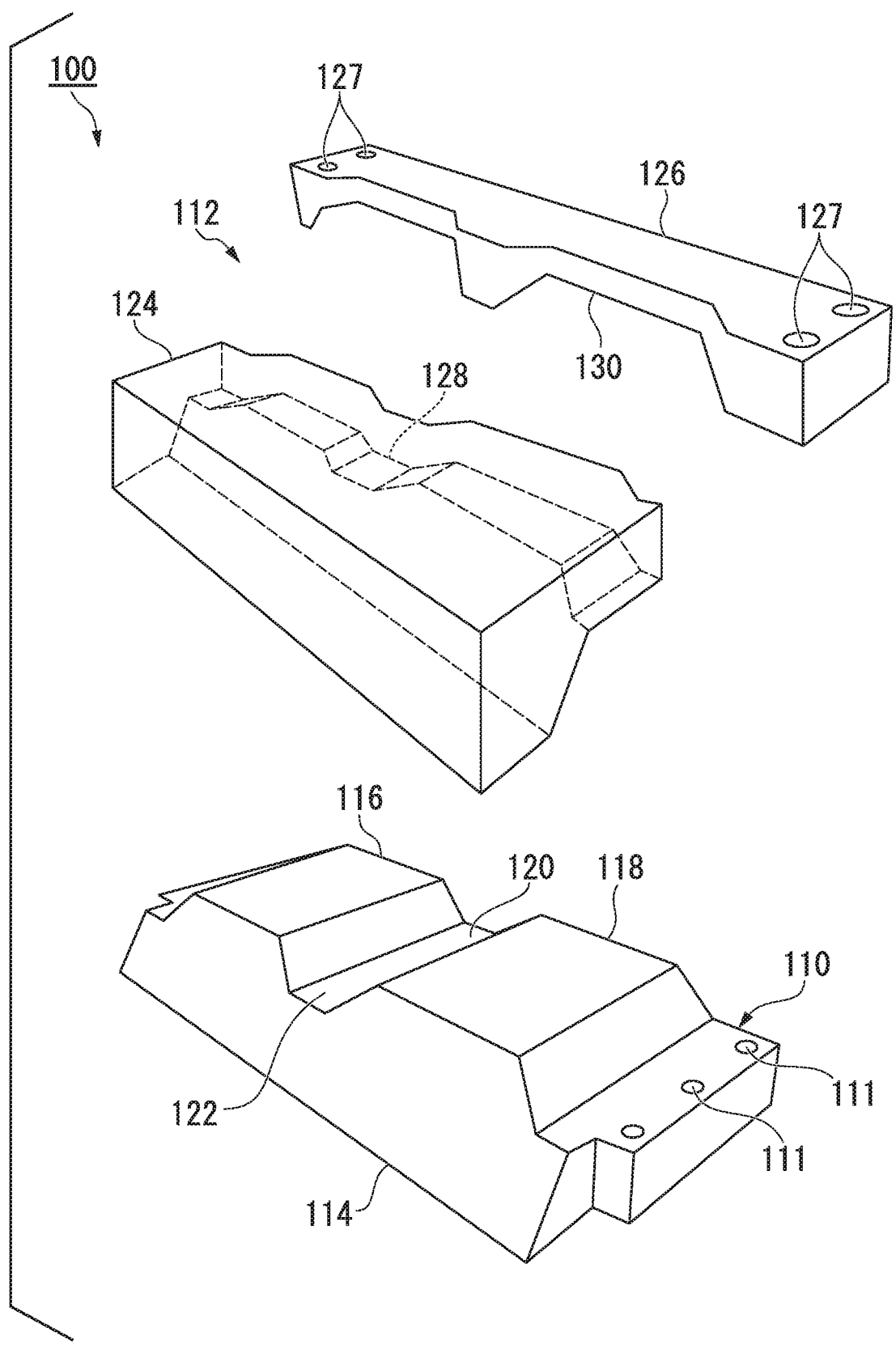
FIG. 5 is a perspective view illustrating an example of a molding die to be used in the manufacture of a fiber-reinforced composite material of the invention.
Figure 12:
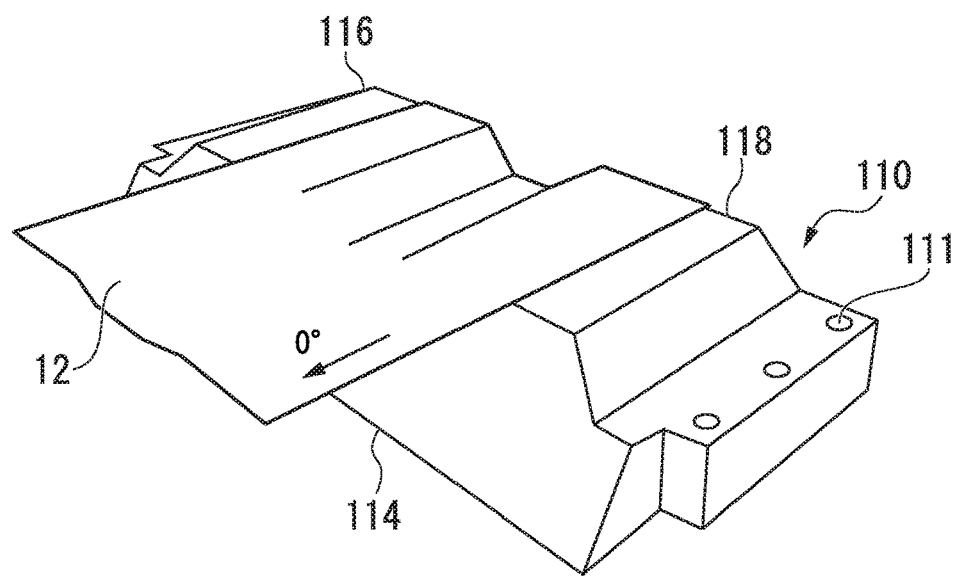
FIG. 12 is a view illustrating a step in an exemplary embodiment of the fabrication of a preform.

The stack 12 thus obtained was subjected to preparatory molding using the molding die 100 exemplified in FIG. 5 to fabricate a preform. Specifically, as illustrated in FIG. 12, the stack 12 was disposed on the lower die 110 fabricated by cutting chemical wood such that the direction of 0° of the prepreg (X) 2 of the first layer was the direction of the arrow and then an operator pressed the stack 12 against the groove of the upper part of the lower die 110 by hands to stick the stack 12.

Figure 13:
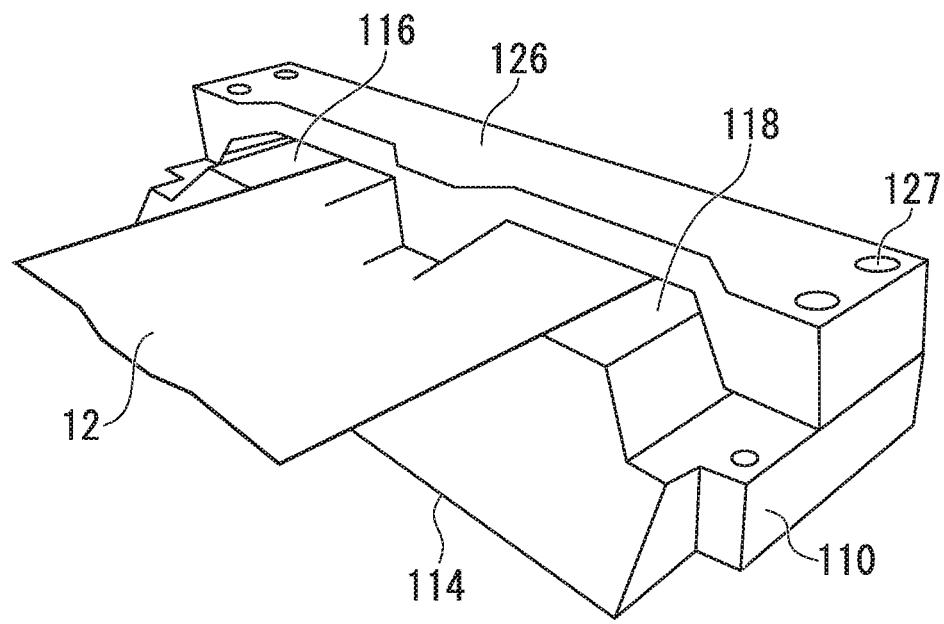
FIG. 13 is a view illustrating a step in an exemplary embodiment of the fabrication of a preform.

Subsequently, as illustrated in FIG. 13, the stack 12 was pressed by the sub die 126 and fixed by allowing a screw (not illustrated) to pass through the through hole 127 provided to the sub die 126, screwing the screw into the screw hole 111 provided to the lower die 110, and fastening the screw.

Subsequently, the entire stack 12 was heated by using an infrared heater so that the surface temperature reached 60° C.

Figure 14:
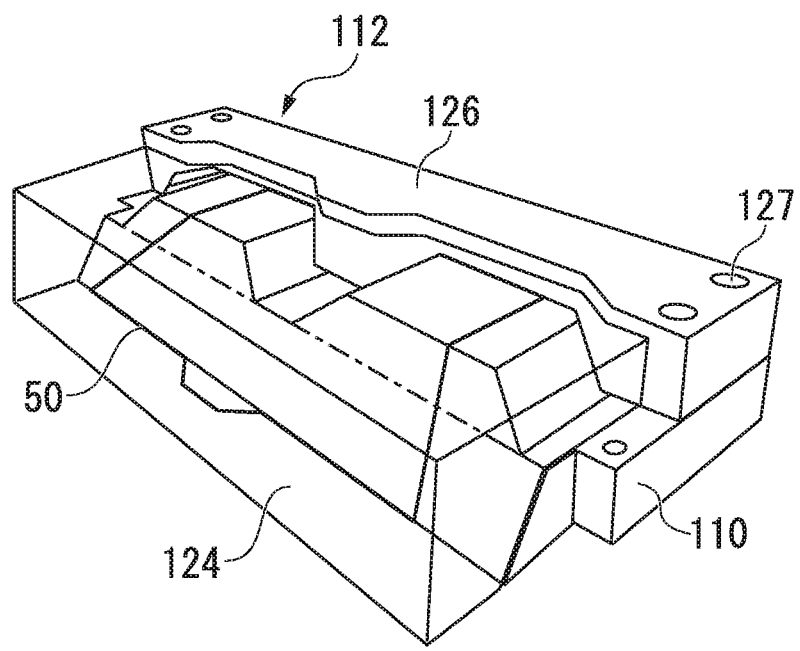
FIG. 14 is a view illustrating a step in an exemplary embodiment of the fabrication of a preform.

Subsequently, as illustrated in FIG. 14, the main die 124 of the upper die 112 moving up and down by an air cylinder (not illustrated) was lowered to be brought close to the lower die 110 and the stack 12 was compressed by the upper die 112 and the lower die 110 for preparatory molding.

Figure 15:
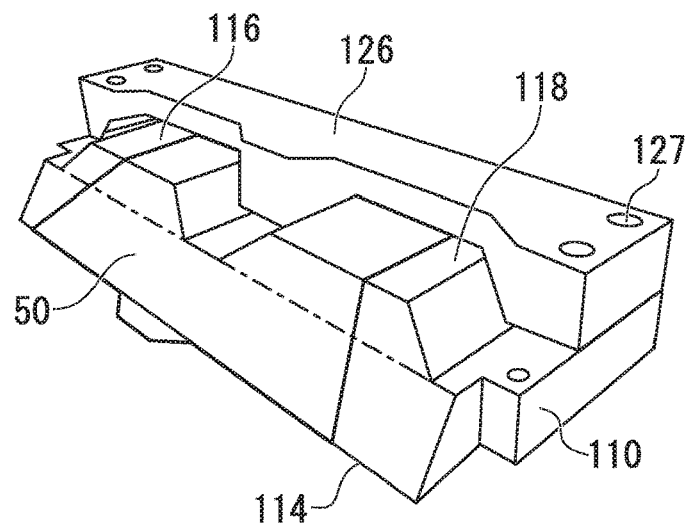
FIG. 15 is a view illustrating a step in an exemplary embodiment of the fabrication of a preform.
Figure 16:
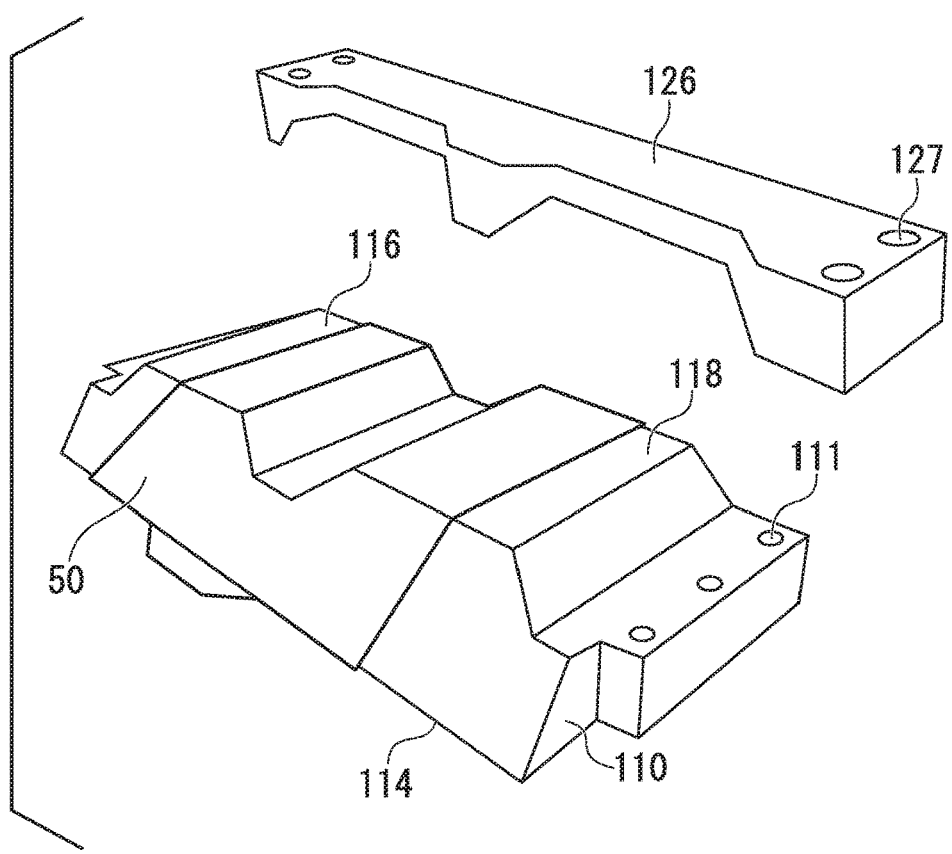
FIG. 16 is a view illustrating a step in an exemplary embodiment of the fabrication of a preform.

As illustrated in FIG. 15, the main die 124 was removed from the lower die 110, and as illustrated in FIG. 16, the screw passed through the through hole 127 was then removed to remove the sub die 126.

Figure 17:
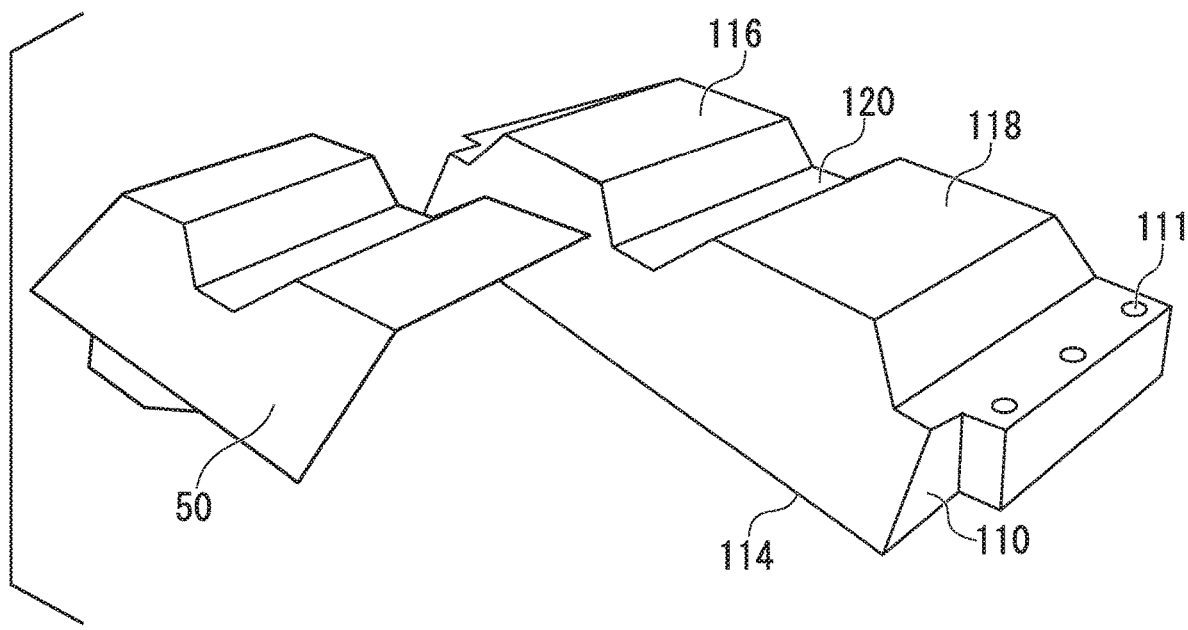
FIG. 17 is a view illustrating a step in an exemplary embodiment of the fabrication of a preform.

Subsequently, as illustrated in FIG. 17, a preform 50 was removed from the lower die 110. Wrinkles were not generated in the preform 50 thus obtained.

Subsequently, the molding die for compression molding provided with a clearance fitted to the thickness of 1.1 mm of the intended fiber-reinforced composite material 30 was heated to 140° C., the preform 50 was placed on the lower die of the molding die for compression molding, the molding die for compression molding was closed, manually pressurized at a set pressure of 4 Mpa, and held for 10 minutes, thereby obtaining a fiber-reinforced composite material. The fiber-reinforced composite material thus obtained had an excellent appearance and stable mechanical properties in each direction.

EXAMPLE 2

By the same methods as in Example 1, three laminated units 1 and two resin films (Y) having a size of 250 mm in length×250 mm in width were fabricated. Subsequently, a preform was obtained by the same procedure as in Example 1 except that a stack having a laminated configuration of laminated unit 1/resin film (Y)/laminated unit 1/resin film (Y)/laminated unit 1 was fabricated. The laminated order of all the three laminated units 1 in the stack was set to [0°/90°/resin film (Y1)/45°/135°] from the top. In addition, a fiber-reinforced composite material was obtained in the same manner as in Example 1 except that the clearance of the molding die for compression molding was set to 4.1 mm.

Wrinkles were not generated in the preform thus obtained. In addition, the fiber-reinforced composite material thus obtained had an excellent appearance and stable mechanical properties in each direction.

EXAMPLE 3

A preform was obtained by the same procedure as in Example 1 except that two laminated units 1 were fabricated in the same manner as in Example 1 and the prepregs (X) 6 of the fifth layer of the two laminated units 1 were opposed to each other and a stack having a laminated configuration in which the laminated order was symmetrical in the thickness direction was fabricated. In addition, a fiber-reinforced composite material was obtained in the same manner as in Example 1 except that the clearance of the molding die for compression molding was set to 2.3 mm.

Wrinkles were not generated in the preform thus obtained. In addition, the fiber-reinforced composite material thus obtained had an excellent appearance and stable mechanical properties in each direction.

EXAMPLE 4

A preform and a fiber-reinforced composite material were fabricated in the same manner as in Example 1 except that the fiber direction of the prepreg (X) 5 of the fourth layer was set to 30° and the fiber direction of the prepreg (X) 6 of the fifth layer was set to 120° in the laminated unit 1.

Wrinkles were not generated in the preform thus obtained. In addition, the fiber-reinforced composite material thus obtained had an excellent appearance and stable mechanical properties in each direction.

EXAMPLE 5

A preform and a fiber-reinforced composite material were fabricated in the same manner as in Example 1 except that the fiber direction of the prepreg (X) 5 of the fourth layer was set to 60° and the fiber direction of the prepreg (X) 6 of the fifth layer was set to 150° in the laminated unit 1.

Wrinkles were not generated in the preform thus obtained. In addition, the fiber-reinforced composite material thus obtained had an excellent appearance and stable mechanical properties in each direction.

EXAMPLE 6

A preform and a fiber-reinforced composite material were fabricated in the same manner as in Example 1 except that the fiber direction of the prepreg (X) 5 of the fourth layer was set to 50° and the fiber direction of the prepreg (X) 6 of the fifth layer was set to 130° in the laminated unit 1.

Wrinkles were not generated in the preform thus obtained. In addition, the fiber-reinforced composite material thus obtained had an excellent appearance and stable mechanical properties in each direction.

EXAMPLE 7

A preform and a fiber-reinforced composite material were fabricated in the same manner as in Example 1 except that a resin film formed of an epoxy resin composition (resin name: #395 manufactured by Mitsubishi Rayon Co., Ltd.) was used instead of the resin film (Y1).

Wrinkles were not generated in the preform thus obtained. In addition, the fiber-reinforced composite material thus obtained had an excellent appearance and stable mechanical properties in each direction.

EXAMPLE 8

A preform was obtained by the same procedure as in Example 1 except that the same resin film as the resin film (Y1) except that the thickness was 0.5 mm was used instead of the resin film (Y1). In addition, a fiber-reinforced composite material was obtained in the same manner as in Example 1 except that the clearance of the molding die for compression molding was set to 1.3 mm.

Wrinkles were not generated in the preform thus obtained. In addition, the fiber-reinforced composite material thus obtained had an excellent appearance and stable mechanical properties in each direction.

EXAMPLE 9

A preform was obtained by the same procedure as in Example 1 except that the same resin film as the resin film (Y1) except that the thickness was 1.0 mm was used instead of the resin film (Y1). In addition, a fiber-reinforced composite material was obtained in the same manner as in Example 1 except that the clearance of the molding die for compression molding was set to 1.8 mm.

Wrinkles were not generated in the preform thus obtained. In addition, the fiber-reinforced composite material thus obtained had an excellent appearance and stable mechanical properties in each direction.

EXAMPLE 10

A preform was obtained by the same procedure as in Example 1 except that a sheet-shaped cloth prepreg (product name: TR 3110 391GMP manufactured by Mitsubishi Rayon Co., Ltd.) in which a fabric obtained by weaving carbon fibers so that the fibers cross each other at right angles was impregnated with an epoxy resin composition was used instead of the prepreg (X1). In addition, a fiber-reinforced composite material was obtained in the same manner as in Example 1 except that the clearance of the molding die for compression molding was set to 1.2 mm.

Wrinkles were not generated in the preform thus obtained. In addition, the fiber-reinforced composite material thus obtained had an excellent appearance and stable mechanical properties in each direction.

The lamination conditions and the evaluation results of the preforms and the fiber-reinforced composite materials of the respective Examples are presented in Table 1. With regard to the evaluation of the preform, those in which the generation of wrinkles was not observed were evaluated to be favorable and those in which the generation of wrinkles was observed were evaluated to be unfavorable. With regard to the evaluation of the fiber-reinforced composite material, those having an excellent appearance and stable mechanical properties in each direction were evaluated to be favorable and those having a defective appearance or an ununiform or decreased strength were evaluated to be unfavorable.

TABLE 1

| | | Resin film | | Stack | Evaluation on appearance | |
|---|---|---|---|---|---|---|
| | Product name of prepreg | Product name | Thickness [mm] | Laminated configuration | Preform | Fiber-reinforced composite material |
| Example 1 | TR391E250S | #391 | 0.3 | [0°/90°/resin film/45°/135°] | Favorable | Favorable |
| Example 2 | | | | [0°/90°/resin film/45°/135°/resin film/0°/90°/resin film/45°/135°/resin film/0°/90°/resin film/45°/135°] | Favorable | Favorable |
| Example 3 | | | | [0°/90°/resin film/45°/135°/135°/45°/resin film/90°/0°] | Favorable | Favorable |
| Example 4 | | | | [0°/90°/resin film/30°/120°] | Favorable | Favorable |
| Example 5 | | | | [0°/90°/resin film/60°/150°] | Favorable | Favorable |
| Example 6 | | | | [0°/90°/resin film/50°/130°] | Favorable | Favorable |
| Example 7 | | #395 | | [0°/90°/resin film/45°/135°] | Favorable | Favorable |
| Example 8 | | #391 | 0.5 | | Favorable | Favorable |
| Example 9 | | | 1.0 | | Favorable | Favorable |
| Example 10 | TR3110391GMP | | 0.3 | | Favorable | Favorable |

PRODUCTION EXAMPLE 1: MANUFACTURE OF STACK

Five UD prepregs (product name: TR361E250S manufactured by Mitsubishi Rayon Co., Ltd., thickness: about 220 μm) in which carbon fibers (product name: TR50S manufactured by Mitsubishi Rayon Co., Ltd.) aligned in one direction were impregnated with a thermosetting resin composition (resin name: #361 manufactured by Mitsubishi Rayon Co., Ltd.) were laminated so that the fiber directions were in the order of 0°/90°/0°/90°/0°, thereby obtaining a stack composed of a prepreg laminate having a length of 250 mm×a width of 250 mm in a planar view.

EXAMPLE 11

A preform was manufactured by using the molding die 100 exemplified in FIG. 5. A surplus region is provided in the molding die 100 so that the stretchable sheet came into contact with the outside of the part at which the preform was disposed on the top surfaces of the convex portion 116 and the convex portion 118 in a planar view with a width of from 175 mm to 190 mm. In addition, the surplus region with which the extended stretchable sheet came into contact was provided by setting the height of the lower die 110 to be from 2 to 2.5 times the height in a front view of the intended preform.

A polyvinyl chloride sheet (stretchable sheet 10, product name: general purpose PVC transparency.satin clear plastic film (film thickness: 0.2 mm, modulus of elasticity in tension: 18.0 MPa) manufactured by Okamoto Industries, Inc., 400 mm in length×400 mm in width×0.2 mm in thickness) was disposed on the lower die 110 so as to cover the entire molding surface 122, and the stack (stack 12) obtained in Production Example 1 was further disposed thereon. Subsequently, the stretchable sheet 10 and the stack 12 were fixed by the sub die 126. The stretchable sheet 10 was gripped by the clamps 132 and 134 equipped to the tensile force applying means, a tensile force was applied to the stretchable sheet 10, and the stretchable sheet 10 was tensioned such that the stretchable sheet 10 partly came into contact with the upper surfaces of the convex portion 116 and the convex portion 118. The direction in which the tensile force was applied by the clamps 132 and 134 was set to be 45° with respect to the fiber axis direction (0° and 90°) of the reinforcing fiber in the stack. The angle formed by the direction in which the tensile force was applied to the stretchable sheet 10 and the horizontal direction was set to 0°.

Subsequently, the stack 12 was heated to 70° C. by using an infrared heater, the main die 124 of the upper die 112 was brought close to the part on the front side of the lower die 110, and the stack 12 was molded by the lower die 110 and the upper die 112 while extending the stretchable sheet 10.

Subsequently, the primary molded product was disposed again on the lower die 110 on which the stretchable sheet 10 was not disposed and fixed by the sub die 126. The primary molded product was heated to 70° C. by using an infrared heater, the main die 124 of the upper die 112 was brought close to the part on the front side of the lower die 110, and the primary molded product was molded by the lower die 110 and the upper die 112. After the temperature of the preform thus molded reached 23° C., the upper die 112 was separated from the lower die 110, and the preform was removed from the die.

EXAMPLE 12

A preform was obtained in the same manner as in Example 11 except that a silicone rubber sheet (product name: EL78 manufactured by TORR Technologies, Inc., modulus of elasticity in tension: 16.0 MPa, 300 mm in length×300 mm in width×1.6 mm in thickness) was used as a stretchable sheet instead of a polyvinyl chloride sheet.

EXAMPLE 13

A preform was obtained in the same manner as in Example 11 except that a silicone rubber sheet (product name: EL78 manufactured by TORR Technologies, Inc., modulus of elasticity in tension: 16.0 MPa, 300 mm in length×300 mm in width×1.6 mm in thickness) was used as a stretchable sheet instead of a polyvinyl chloride sheet and the sheet was tensioned by pulling the sheet in all directions in the plane direction with a paper tape.

EXAMPLE 14

A preform was obtained in the same manner as in Example 11 except that a natural rubber sheet (product name: RN111 manufactured by SI-TEKU Corporation (modulus of elasticity in tension: about 10 MPa, 300 mm in length×300 mm in width×1.0 mm in thickness) was used as a stretchable sheet instead of a polyvinyl chloride sheet.

[Evaluation on Appearance]

The appearance of the preforms obtained in the respective Examples was visually confirmed and evaluated according to the following evaluation criteria.

(Evaluation Criteria)

○: Wrinkles are not observed on preform.

Δ: Wrinkles are slightly observed on preform but to level without having problem.

x: Wrinkles are observed on preform.

The manufacturing conditions and evaluation results of Examples are presented in Table 2.

TABLE 2

|  | Manufacturing conditions | | | | |
|---|---|---|---|---|---|
|  | Stretchable sheet | | | Number of | Evaluation on |
|  | Material | Thickness [mm] | Extending direction of stretchable sheet | molding | appearance |
| Example 11 | Polyvinyl chloride | 0.2 | 45° with respect to fiber axis orientation (0°/90°) of prepreg | 2 | ○ |
| Example 12 | Silicone rubber | 1.6 | (0°/90°) of prepreg |  | ○ |
| Example 13 |  |  | All directions |  | Δ |
| Example 14 | Natural rubber | 1.0 | 45° with respect to fiber axis orientation (0°/90°) of prepreg |  | ○ |

After the temperature of the primary molded product thus molded reached 23° C., the upper die 112 was separated from the lower die 110, and the primary molded product was removed from the die.

As presented in Table 2, in Examples 11 to 14 in which the preform was manufactured by using a stretchable sheet, the generation of wrinkles in the preform was suppressed and the appearance was excellent.

EXAMPLE 15

A preform was obtained under the same conditions as in Example 11 except that the stack used in Example 1 was used. In addition, a fiber-reinforced composite material was fabricated from the preform thus obtained under the same conditions as in Example 1. The preform and fiber-reinforced composite material thus obtained both had a favorable appearance as wrinkles were not generated, the mechanical properties in each direction were also stable in this fiber-reinforced composite material.

EXPLANATIONS OF LETTERS OR NUMERALS

1 Laminated unit
2, 3, 5, and 6 Prepreg (X)
4 Resin film (Y)
10 Stretchable sheet
12 Stack
100 Molding die
110 Lower die
112 Upper die
114 Main body portion
116 and 118 Convex portion
120 Concave portion
122 Molding surface
124 Main die
126 Sub die
128 and 130 Molding surface
132 and 134 Clamp

The invention claimed is:

1. A method for manufacturing a fiber-reinforced composite material, the method comprising:
    laminating a plurality of sheet-shaped prepregs (X), each of which comprises a plurality of consecutively arranged reinforcing fibers impregnated with a matrix resin composition, such that fiber directions differ among at least two of the prepregs (X), thereby obtaining a stack;
    forming the stack into a preform by preliminary molding, using a pair of the dies; and
    further subjecting the preform to compression molding to obtain a fiber-reinforced composite material having a three-dimensional shape,
    wherein, in the preliminary molding, at least a part of the stack is pressed between the pair of dies, with a stretchable resin or rubber sheet disposed between the at least a part of the stack and one of the pair of dies, in a state in which a tensile force is applied to the at least a part of the stack by tensioning the stretchable sheet from outside the pair of dies such that an angle formed by a fiber direction of each prepreg (X) in the stack and a direction in which the stretchable sheet is tensioned is from 15° to 75°.

2. The method for manufacturing a fiber-reinforced composite material according to claim 1, wherein the angle formed by the fiber direction of each prepreg (X) in the stack and the direction in which the stretchable sheet is tensioned is from 30° to 60°.

3. The method according to claim 1, wherein the stack comprises a UD (unidirectional) prepreg.

4. The method according to claim 1, wherein the stack comprises a cloth prepreg.

5. The method according to claim 1, wherein the stack comprises a resin film.

6. The method according to claim 1, wherein the stretchable resin or rubber sheet exhibits adhesive property to the stack.

7. The method according to claim 1, wherein the stretchable resin or rubber sheet has a modulus of elasticity in tension of 0.1 MPa or more and 40 MPa or less.

8. The method according to claim 1, wherein the product of a thickness (in mm) and a modulus of elasticity in tension (in MPa) in the stretchable resin or rubber sheet is in a range of 1 to 6.

\* \* \* \* \*